(12) United States Patent
Yamazaki et al.

(10) Patent No.: US 10,607,381 B2
(45) Date of Patent: Mar. 31, 2020

(54) INFORMATION PROCESSING APPARATUS

(71) Applicant: CANON KABUSHIKI KAISHA, Tokyo (JP)

(72) Inventors: Taeko Yamazaki, Kawasaki (JP); Hiromasa Kawasaki, Tokyo (JP); Tadanori Nakatsuka, Kawasaki (JP); Kinya Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/789,205

(22) Filed: Jul. 1, 2015

(65) Prior Publication Data

US 2016/0005202 A1    Jan. 7, 2016

(30) Foreign Application Priority Data

Jul. 7, 2014    (JP) .................................. 2014-139866
Jul. 7, 2014    (JP) .................................. 2014-139867
Aug. 22, 2014    (JP) .................................. 2014-169416

(51) Int. Cl.
| | | |
|---|---|---|
| G06K 9/72 | (2006.01) | |
| G06T 11/60 | (2006.01) | |
| G06T 11/00 | (2006.01) | |
| G06K 9/00 | (2006.01) | |
| G06K 9/20 | (2006.01) | |

(52) U.S. Cl.
CPC .......... *G06T 11/60* (2013.01); *G06K 9/00449* (2013.01); *G06K 9/2081* (2013.01); *G06T 11/001* (2013.01)

(58) Field of Classification Search
CPC ... G06K 9/00449; G06K 9/2081; G06T 11/60

USPC .......................................................... 382/229
See application file for complete search history.

(56) References Cited

U.S. PATENT DOCUMENTS

| | | | |
|---|---|---|---|
| 5,696,841 A | 12/1997 | Nakatsuka | |
| 5,703,962 A | 12/1997 | Niki et al. | |
| 5,872,574 A | 2/1999 | Hara et al. | |
| 6,283,654 B1 * | 9/2001 | Tsukagoshi | ........... G06F 17/245 400/61 |
| 6,504,540 B1 * | 1/2003 | Nakatsuka | ......... G06K 9/00442 345/619 |
| 6,628,832 B2 | 9/2003 | Kanatsu | ........................ 382/173 |
| 8,503,773 B2 | 8/2013 | Kanatsu et al. | |

(Continued)

FOREIGN PATENT DOCUMENTS

| | | |
|---|---|---|
| JP | H08-161306 | 6/1996 |
| JP | H09-016566 | 1/1997 |

(Continued)

OTHER PUBLICATIONS

Snagit 10.0.0 Tutorial, May 2010.*

(Continued)

*Primary Examiner* — Manuchehr Rahmjoo
(74) *Attorney, Agent, or Firm* — Venable LLP

(57) ABSTRACT

In the case where a table region is erroneously recognized, the edition of a character is facilitated. An information processing apparatus selects one selectable region from an image. According to the change of the position of the region selected by a selecting unit, a region that is included in the region before the position change and that is not included in the region after the position change is set to a new selectable region.

8 Claims, 39 Drawing Sheets

(56) References Cited

U.S. PATENT DOCUMENTS

| 8,831,364 B2 | 9/2014 | Kawasaki | |
|---|---|---|---|
| 2003/0123727 A1 | 7/2003 | Kanatsu | 382/173 |
| 2008/0040655 A1 | 2/2008 | Tanaka | 715/228 |
| 2014/0164996 A1 | 6/2014 | Takahashi | G06F 3/0482 |

FOREIGN PATENT DOCUMENTS

| JP | H11-110479 | 4/1999 |
| JP | 2000-090195 | 3/2000 |
| JP | 2001-067425 | 3/2001 |
| JP | 2001-094760 A | 4/2001 |
| JP | 2004-086436 | 3/2004 |
| JP | 2012-194804 | 10/2012 |
| JP | 2014-115894 | 6/2014 |

OTHER PUBLICATIONS

U.S. Appl. No. 07/739,651, filed Aug. 2, 1991, Applicant: Nakatsuka.
Office Action dated May 15, 2018 in counterpart Japan Application No. 2014-139867, together with English translation thereof.
Office Action dated Jul. 25, 2018 in counterpart Japan Application No. 2014-139866, together with English translation thereof.
Office Action dated Jan. 23, 2018 in counterpart JP Application No. 2014-169416 with translation.
Office Action dated Aug. 29, 2018 in counterpart Japan Application No. 2014-139867, together with machine-generated translation thereof.

\* cited by examiner

Invoice

Invoice# ABC123456
Date: 07/28/2014
Deadline: 09/30/2014

SOLD TO
Kawasaki BlackBlue Co.,Ltd.
53, Imai Kamicho,
Nakahara-ku Kawasaki-shi,
Kanagawa, 〒211-8501
Tel 044-987-6543
Fax 044-987-6544

SENDER
Tokyo AOAK Inc.
3-30-2, Shimomaruko,
Ota-ku, Tokyo,
〒146-8501
Tel 03-3456-7890
Fax 03-3456-0987

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

Subtotal ¥815000
Tax 8% ¥65200
Sum Total ¥880200

DIRECT ALL INQUIRIES TO: Morishige
Emai:Oden-Morige@Tokyo.aoak.com
THANK YOU FOR YOUR BUSINESS!!

FIG.1

Invoice

401

Invoice# ABC123456
Date: 07/28/2014
Deadline: 09/30/2014

402

SOLD TO
Kawasaki BlackBlue Co.,Ltd.
53, Imai Kamicho,
Nakahara-ku Kawasaki-shi
Kanagawa, 〒211-8501
Tel 044-987-6543
Fax 044-987-6544

SENDER
Tokyo AOAK Inc.
3-30-2, Shimomaruko,
Ota-ku, Tokyo,
〒146-8501
Tel 03-3456-7890
Fax 03-3456-0987

403
404
406

| Description | Quantity | Unit Price | Amount |
|---|---|---|---|
| Stuffed Toy | 100 | 1,200 | 120,000 |
| Gym Bag | 50 | 3,500 | 175,000 |
| Wallet 407 | 100 | 2,000 | 200,000 |
| Home Uniform | 20 | 8,000 | 160,000 |
| Away Uniform | 20 | 8,000 | 160,000 |
|  |  |  |  |
|  |  |  |  |

405

Subtotal ¥815,000
Tax 8% ¥65,200
Sum Total ¥880,200

DIRECT ALL INQUIRIES TO: Morishige
Emai:Oden-Morige@Tokyo.aoak.com

THANK YOU FOR YOUR BUSINESS!!

FIG.4

Invoice

Invoice# ABC123456
Date: 07/28/2014
Deadline: 09/30/2014

SOLD TO
Kawasaki BlackBlue Co.,Ltd.
53, Imai Kamicho,
Nakahara-ku Kawasaki-shi,
Kanagawa, 〒211-8501
Tel 044-987-6543
Fax 044-987-6544

SENDER
Tokyo AOAK Inc.
3-30-2, Shimomaruko,
Ota-ku, Tokyo,
〒146-8501
Tel 03-3456-7890
Fax 03-3456-0987

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

Subtotal ¥ 8 1 5 0 0 0
Tax 8% ¥ 6 5 2 0 0
Sum Total ¥ 8 8 0 2 0 0

DIRECT ALL INQUIRIES TO: Morishige
Emai:Oden-Morige@Tokyo.aoak.com
THANK YOU FOR YOUR BUSINESS!!

FIG.6

Invoice

Invoice# ABC123456
Date: 07/28/2014
Deadline: 09/30/2014

806　807　808

SOLD TO
Kawasaki BlackBlue Co.,Ltd.

53, Imai Kamicho,
Nakahara-ku Kawasaki-shi,
Kanagawa, 〒211-8501
Tel 044-987-6543
Fax 044-987-6544

SENDER
Tokyo AOAK Inc.

3-30-2, Shimomaruko,
Ota-ku, Tokyo, 805
〒146-8501

120,000

[ OK ] [ Apply ] [ Cancel ]

804
802
803
801

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

Subtotal ¥ 8 1 5 0 0 0
Tax 8% ¥ 6 5 2 0 0
Sum Total ¥ 8 8 0 2 0 0

DIRECT ALL INQUIRIES TO: Morishige
　　　　　　　Emai:Oden-Morige@Tokyo.aoak.com

THANK YOU FOR YOUR BUSINESS!!

FIG.8

Invoice

Invoice# ABC123456
Date: 07/28/2014
Deadline: 09/30/2014

SOLD TO
Kawasaki BlackBlue Co.,Ltd.

53, Imai Kamicho,
Nakahara-ku Kawasaki-shi,
Kanagawa, 〒211-8501
Tel 044-987-6543
Fax 044-987-6544

SENDER
Tokyo AOAK Inc.

3-30-2, Shimomaruko,
Ota-ku, Tokyo,
〒146-8501

300,000

[ OK ] [ Apply ] [ Cancel ]

| Description | Quantity | Unit Price | Amount |
|---|---|---|---|
| Stuffed Toy | 100 | 1,200 | 300,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

Subtotal ¥815000
Tax 8%  ¥65200
Sum Total ¥880200

DIRECT ALL INQUIRIES TO: Morishige
Emai:Oden-Morige@Tokyo.aoak.com

THANK YOU FOR YOUR BUSINESS!!

FIG.10

Invoice

1301

| | |
|---|---|
| Invoice# | ABC123456 |
| Date: | 07/28/2014 |
| Deadline: | 09/30/2014 |

SOLD TO
Kawasaki BlackBlue Co.,Ltd.
53, Imai Kamicho,
Nakahara-ku Kawasaki-shi,
Kanagawa, 〒211-8501
Tel  044-987-6543
Fax  044-987-6544

SENDER
Tokyo AOAK Inc.
3-30-2, Shimomaruko,
Ota-ku, Tokyo,
〒146-8501
Tel  03-3456-7890
Fax  03-3456-0987

Gym

[ OK ] [ Apply ] [ Cancel ]

| Item | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | |

803
802
406
407

Subtotal ¥ 8 1 5 0 0 0
Tax 8%  ¥ 6 5 2 0 0
Sum Total ¥ 8 8 0 2 0 0

DIRECT ALL INQUIRIES TO:Morishige
Emai:Oden-Morige@Tokyo.aoak.com

THANK YOU FOR YOUR BUSINESS!!

FIG.13

Invoice

| | |
|---|---|
| Invoice# | ABC123456 |
| Date: | 07/28/2014 |
| Deadline: | 09/30/2014 |

SOLD TO
Kawasaki BlackBlue Co., Ltd.
53, Imai Kamicho,
Nakahara-ku Kawasaki-shi,
Kanagawa, 〒211-8501
Tel 044-987-6543
Fax 044-987-6544

SENDER
Tokyo AOAK Inc.
3-30-2, Shimomaruko,
Ota-ku, Tokyo,
〒146-8501
Tel 03-3456-7890
Fax 03-3456-0987

[Gym] [OK] [Apply] [Cancel]

| | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | | drag

| | |
|---|---|
| Subtotal | ¥815,000 |
| Tax 8% | ¥65,200 |
| Sum Total | ¥880,200 |

DIRECT ALL INQUIRIES TO: Morishige
Emai:Oden-Morige@Tokyo.aoak.com

THANK YOU FOR YOUR BUSINESS!!

Invoice

Invoice#    ABC123456
Date:       07/28/2014
Deadline:   09/30/2014

SOLD TO
Kawasaki BlackBlue Co.,Ltd.
53, Imai Kamicho,
Nakahara-ku Kawasaki-shi,
Kanagawa, 〒211-8501
Tel  044-987-6543
Fax  044-987-6544

SENDER
Tokyo AOAK Inc.
3-30-2, Shimomaruko,
Ota-ku, Tokyo,
〒146-8501
Tel  03-3456-7890
Fax  03-3456-0987

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | | | |
| Away Uniform | | | |
| | | | |
| | | | |

¥815000

○ DELETE INTERIOR OF RECOGNIZED CELL AFTER COUPLING
○ DELETE INTERIOR OF RECOGNIZED CELL BEFORE COUPLING

[OK] [Apply] [Cancel]

1601

Subtotal   ¥815000
Tax 8%     ¥65200
Sum Total  ¥880200

DIRECT ALL INQUIRIES TO: Morishige
                 Emai:Oden-Morige@Tokyo.aoak.com

THANK YOU FOR YOUR BUSINESS!!

FIG.16

Invoice

Invoice# ABC123456
Date: 07/28/2014
Deadline: 09/30/2014

SOLD TO
Kawasaki BlackBlue Co.,Ltd.
53, Imai Kamicho,

DescriptionQuantityUnitPri
OK  Apply  Cancel

SENDER
Tokyo AOAK Inc.
3-30-2, Shimomaruko,
Ota-ku, Tokyo,
〒146-8501
Tel 03-3456-7890
Fax 03-3456-0987

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

Subtotal ¥815000
Tax 8%   ¥65200
Sum Total ¥880200

DIRECT ALL INQUIRIES TO: Morishige
Emai:Oden-Morige@Tokyo.aoak.com

THANK YOU FOR YOUR BUSINESS!!

FIG.17

Invoice

Invoice# ABC123456
Date: 07/28/2014
Deadline: 09/30/2014

SOLD TO
Kawasaki BlackBlue Co.,Ltd.
53, Imai Kamicho,

DescriptionQuantityUnitPri
OK  Apply  Cancel

SENDER
Tokyo AOAK Inc.

3-30-2, Shimomaruko,
Ota-ku, Tokyo,
〒146-8501
Tel 03-3456-7890
Fax 03-3456-0987

| Description | Quantity | Unit Price | Amount |
|---|---|---|---|
| Stuffed Toy | | drag | |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | |

Subtotal ¥815000
Tax 8%   ¥65200
Sum Total ¥880200

DIRECT ALL INQUIRIES TO: Morishige
  Emai:Oden-Morige@Tokyo.aoak.com
THANK YOU FOR YOUR BUSINESS!!

FIG.18

Invoice

Invoice# ABC123456  
Date: 07/28/2014  
Deadline: 09/30/2014

1901

SOLD TO  
Kawasaki BlackBlue Co.,Ltd.  
53, Imai Kamicho,

Description  
OK  Apply  Cancel

SENDER  
Tokyo AOAK Inc.  
3-30-2, Shimomaruko,  
Ota-ku, Tokyo,  
〒146-8501  
Tel 03-3456-7890  
Fax 03-3456-0987

1803

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

1902

Subtotal ¥ 8 1 5 0 0 0  
Tax 8% ¥ 6 5 2 0 0  
Sum Total ¥ 8 8 0 2 0 0

DIRECT ALL INQUIRIES TO: Morishige  
Emai:Oden-Morige@Tokyo.aoak.com  
THANK YOU FOR YOUR BUSINESS!!

FIG.19

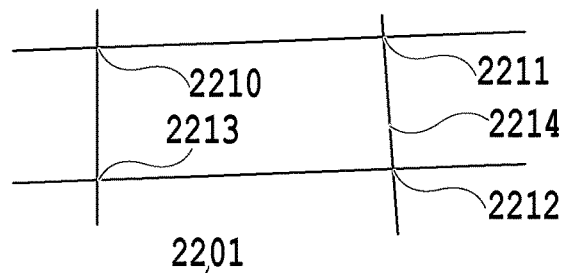
FIG.22A
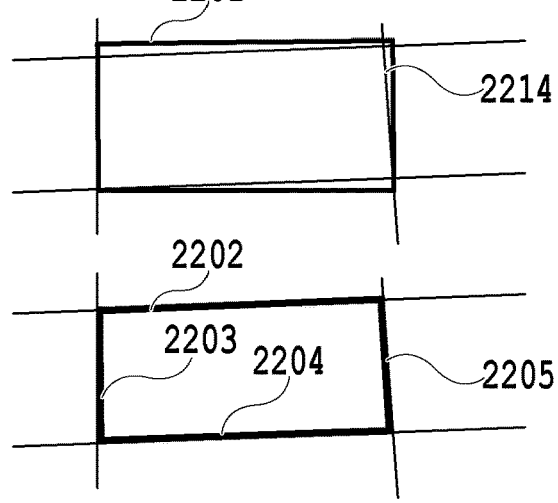
FIG.22B
FIG.22C
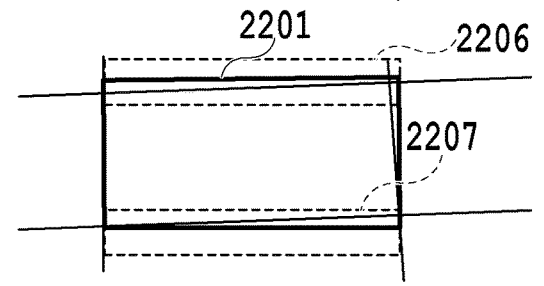
FIG.22D
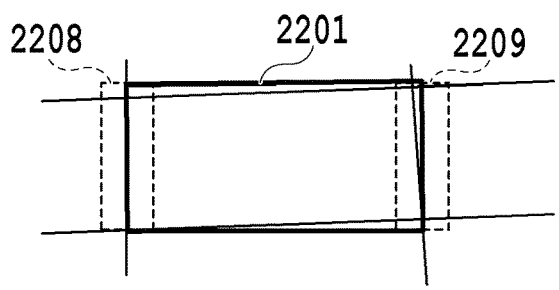
FIG.22E
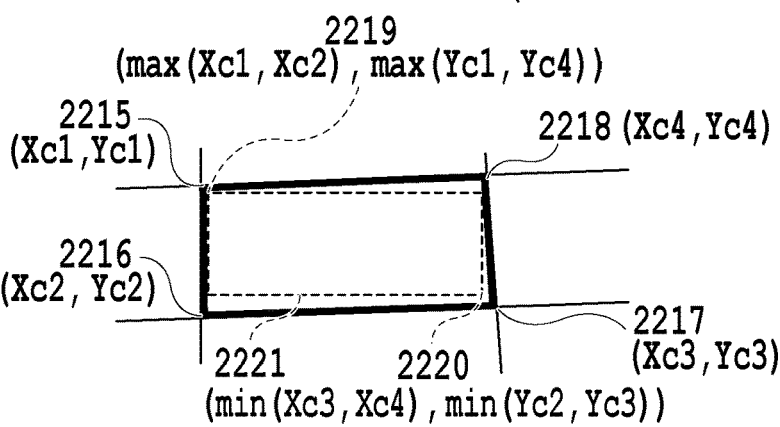
FIG.22F

Invoice

| | |
|---|---|
| Invoice# | ABC123456 |
| Date: | 07/28/2014 |
| Deadline: | 09/30/2014 |

2704

SOLD TO
Kawasaki BlackBlue Co.,Ltd.

DescriptionQuantityUnitPri
[OK] [Apply] [Cancel]
[Partition]
2701

...saki-shi,
8501
-6543
-6544

SENDER
Tokyo AOAK Inc.

3-30-2, Shimomaruko,
Ota-ku, Tokyo,
〒 146-8501
Tel  03-3456-7890
Fax  03-3456-0987

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | |

2702

Subtotal  ¥ 8 1 5 0 0 0
Tax 8%   ¥ 6 5 2 0 0
Sum Total ¥ 8 8 0 2 0 0

DIRECT ALL INQUIRIES TO:Morishige
                Emai:Oden-Morige@Tokyo.aoak.com
THANK YOU FOR YOUR BUSINESS!!

FIG.27

| Description | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
|  |  |  |  |
|  |  |  |  |

FIG.28

Invoice

| | |
|---|---|
| Invoice# | ABC123456 |
| Date: | 07/28/2014 |
| Deadline: | 09/30/2014 |

SOLD TO
Kawasaki BlackBlue Co.,Ltd.
53, Imai Kamicho,
Nakahara-ku Kawasaki-shi,
Kanagawa, 〒211-8501
Tel  044-987-6543
Fax  044-987-6544

SENDER
Tokyo AOAK Inc.
3-30-2, Shimomaruko,
Ota-ku, Tokyo,
〒146-8501
Tel  03-3456-7890
Fax  03-3456-0987

Gym

[ OK ] [ Apply ] [ Cancel ]

| | Quantity | Unit Price | Amount |
|---|---|---|---|
| Stuffed Toy | 100 | 1,200 | 120,000 |
| Gym Bag | 50 | 3,500 | 175,000 |
| Wallet | 100 | 2,000 | 200,000 |
| Home Uniform | 20 | 8,000 | 160,000 |
| Away Uniform | 20 | 8,000 | 160,000 |
| | | | |
| | | | |

406
407
drag
3401
601

Subtotal ¥ 8 1 5 0 0 0
Tax 8%  ¥ 6 5 2 0 0
Sum Total ¥ 8 8 0 2 0 0

DIRECT ALL INQUIRIES TO: Morishige
              Emai:Oden-Morige@Tokyo.aoak.com

THANK YOU FOR YOUR BUSINESS!!

FIG.34

Invoice

Invoice# ABC123456
Date: 07/28/2014
Deadline: 09/30/2014

| SOLD TO | SENDER |
|---|---|
| Kawasaki BlackBlue Co.,Ltd. | Tokyo AOAK Inc. |
| 53, Imai Kamicho, Nakahara-ku Kawasaki-shi, Kanagawa, 〒211-8501 | 3-30-2, Shimomaruko, Ota-ku, Tokyo, 〒146-8501 |
| Tel 044-987-6543 | Tel 03-3456-7890 |
| | Fax 03-3456-0987 |

Gym

[ OK ] [ Apply ] [ Cancel ]

| | Quantity | Unit Price | Amount |
|---|---|---|---|
| pinch-in pinch-in | 100 | 1,200 | 120,000 |
| Gym Bag | 50 | 3,500 | 175,000 |
| ll | 100 | 2,000 | 200,000 |
| orm | 20 | 8,000 | 160,000 |
| iform | 20 | 8,000 | 160,000 |
| | | | |
| | | | |

Subtotal ¥815000
Tax 8% ¥65200
Sum Total ¥880200

DIRECT ALL INQUIRIES TO:Morishige
Emai:Oden-Morige@Tokyo.aoak.com

THANK YOU FOR YOUR BUSINESS!!

FIG.36

INFORMATION PROCESSING APPARATUS

BACKGROUND OF THE INVENTION

Field of the Invention

The present invention relates to an information processing apparatus.

Description of the Related Art

FIG. 1 is an example of a scan image obtained by scanning an original document with a scanner. There is a case where this scan image is desired to be edited. Japanese Patent Laid-Open No. 2001-094760 discloses a function of editing a scan image.

Specifically, in Japanese Patent Laid-Open No. 2001-094760, a table region formed with a plurality of ruled lines is identified from the scan image, and furthermore, characters within the table region are recognized. The ruled lines forming the table region are vectorized.

In Japanese Patent Laid-Open No. 2001-094760, as shown in FIG. 5, a display window that displays the scan image and an edition window that displays a result of the vectorization and recognized characters are displayed so as to be aligned from side to side. Then, in the case where a user edits the characters with the edition window, the identified table region is deleted from the scan image displayed on the display window. Then, in the case where a table to which the edited characters are added is generated, the scan image including the generated table is displayed on the display window.

In the case where the method disclosed in Japanese Patent Laid-Open No. 2001-094760 is adopted, if a table region is erroneously recognized, it is difficult to edit characters.

SUMMARY OF THE INVENTION

An information processing apparatus according to the present invention includes: a selecting unit configured to select one selectable region from an image; a changing unit configured to change position of the region selected by the selecting unit; and a setting unit configured to set, according to the change of the position by the changing unit, a region that is included in the region before the change of the position and that is not included in the region after the change of the position to a new selectable region.

Further features of the present invention will become apparent from the following description of exemplary embodiments (with reference to the attached drawings).

BRIEF DESCRIPTION OF THE DRAWINGS

FIG. 1 is an example of a scan image that will be described in the present embodiment;

FIG. 4 is a diagram showing a result of region division of the scan image that will be described in the present embodiment;

FIG. 6 is a diagram showing an example of a display screen displaying a frame of the recognized cell that will be described in the present embodiment;

FIG. 8 is a diagram showing an example of a display screen in the case where the recognized cell that will be described in the present embodiment is selected;

FIG. 10 is a diagram showing a screen displaying characters after the edition that will be described in the present embodiment;

FIG. 13 is a diagram showing an example of a display screen displayed in the case where a recognized cell 406 is selected that will be described in the present embodiment;

FIG. 14 is a diagram showing an example of a display screen displayed in the case where the recognized cell is enlarged in the present embodiment;

FIG. 15 is a diagram showing an example of the display screen displayed in the case where the recognized cell is enlarged in the present embodiment;

FIG. 16 is a diagram showing an example of a display screen displayed after the coupling of the recognized cells that will be described in the present embodiment;

FIG. 17 is a diagram showing an example of a display screen displayed in the case where a recognized cell 407 is selected that will be described in the present embodiment;

FIG. 18 is a diagram showing an example of a display screen displayed in the case where the recognized cell is reduced that will be described in the present embodiment;

FIG. 19 is a diagram showing an example of a display screen displayed after the division of the recognized cell that will be described in the present embodiment;

FIGS. 22A to 22F are diagrams showing a cell-inscribed straight line detection region that will be described in the present embodiment;

FIG. 27 is an example of a display screen in the second embodiment;

FIG. 28 is an example of a table region used in description of a third embodiment;

FIG. 34 is a display screen displayed in the case where recognized cells of the fourth embodiment are coupled;

FIG. 36 is a display screen displayed in the case where the recognized cells of the fifth embodiment are coupled;

DESCRIPTION OF THE EMBODIMENTS

Before the description of embodiments, terms used in the present specification will first be defined.

An "original character" refers to a character in a scan image.

A "recognized character" is either a character code that is obtained by recognizing the original character or a character that is displayed on an edition window and that corresponds to the character code. The recognized character is displayed in the edition window so as to have an edition window character size (the edition window character size means a character size which is set for the edition window).

The "edition of the character" indicates an act of deleting, by a user, the recognized character from the edition window and inputting a replacement character to the edition window. The edited character refers to the input replacement character or a character code corresponding to the character. In the case where the edited character is displayed in the edition window, it is displayed so as to have the edition window character size whereas in the case where it is displayed on the scan image, it is displayed so as to have a scan image character size. Naturally, an act of deleting part of the recognized characters and inputting a replacement character is also included in the "edition of the character." An act of simply deleting the recognized character and an act of inputting, by the user, an additional character to the edition window without deleting the recognized character are also included in the "edition of the character."

The default values of both the scan image character size and the edition window character size are assumed to be previously stored in a storage unit 302.

Embodiments of the present invention will be described below with reference to drawings.

First Embodiment

Configurations of a MFP and an Information Processing Apparatus

Figure 2:
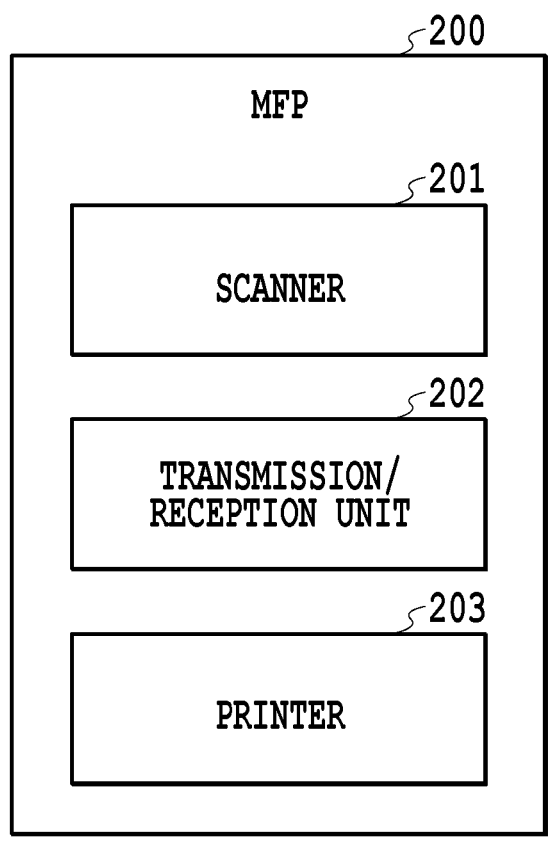
FIG. 2 is a block diagram showing a configuration of a MFP (Multifunction Peripheral) 200 that will be described in the present embodiment.

FIG. 2 shows the configuration of a MFP 200 in the present embodiment. The MFP 200 includes a scanner 201, a transmission/reception unit 202 and a printer 203.

Figure 3:
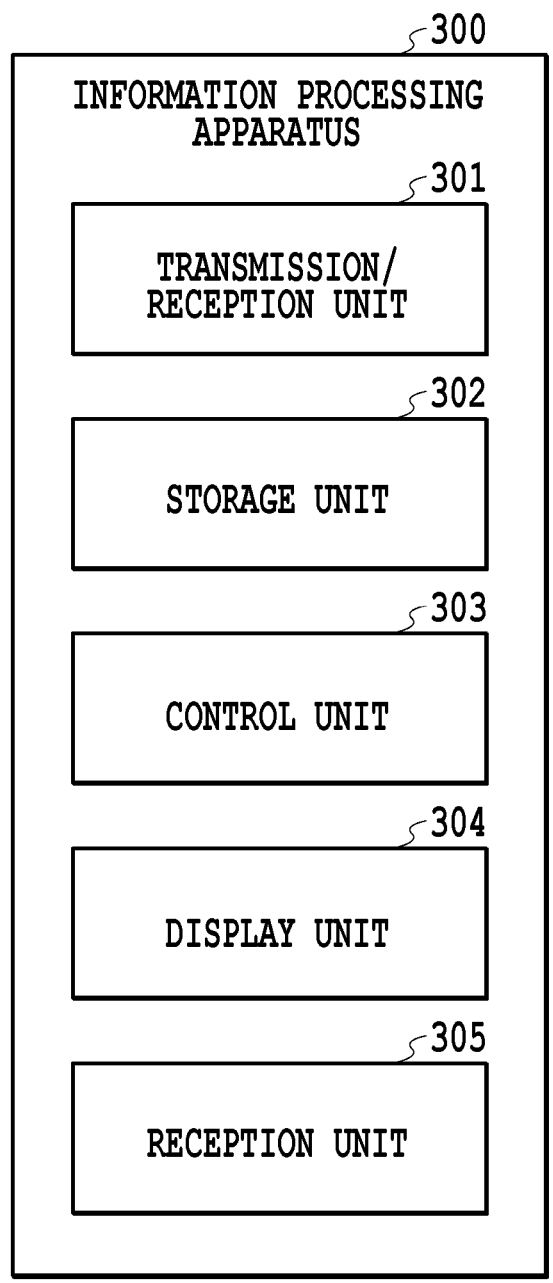
FIG. 3 is a block diagram showing a configuration of an information processing apparatus 300 that will be described in the present embodiment.

FIG. 3 shows the configuration of an information processing apparatus 300 in the present embodiment. The information processing apparatus 300 includes a transmission/reception unit 301, the storage unit 302, a control unit 303, a display unit 304 and a reception unit 305. The information processing apparatus 300 includes, therewithin, a CPU, a ROM and a RAM that are not shown in the figure. The CPU loads, from the ROM, a program for the information processing apparatus 300, utilizes the RAM as a primary storage region and performs the program for the information processing apparatus 300. By the operation described above, processing on the individual units shown in FIG. 3 are performed. Although in general, the reception unit 305 includes a keyboard and a mouse, there is no restriction on this form. The reception unit 305 and the display unit 304 may be integrated. In this case, the reception unit 305 and the display unit 304 are collectively referred to as a touch panel, and the following embodiments are assumed to be interpreted by replacing a click described in the embodiments with a touch.

<From Scan to Region Division and Character Recognition>

Processing performed in the present embodiment will then be described. In the case where the scanner of the MFP 200 scans a document, a scan image (which is also referred to as scan image data) is generated. The generated scan image is transmitted by the transmission/reception unit 202 to the information processing apparatus 300. Then, the transmission/reception unit 301 of the information processing apparatus 300 receives it, and stores the scan image in the storage unit 302.

The user selects, through the reception unit 305, one scan image from among a plurality of scan images stored in the storage unit 302. Then, the control unit 303 displays the scan image on the display unit 304.

The user provides, through the reception unit 305, an instruction to analyze the scan image displayed on the display unit 304. Then, the control unit 303 performs three types of processing, that is, region division, character recognition and recognized cell frame display, which will be described later, and displays the results thereof on the display unit 304.

<Description of the Region Division (1)-(5), the Character Recognition (6) and the Recognized Cell Frame Display (7)>

The region division processing, the character recognition processing and the recognized cell frame display processing discussed above will then be described in detail. The region division processing is performed by the processing of (1) to (5) below. The region division processing, which will be described below, is performed on the scan image of FIG. 1, and thus regions as indicated by the heavy lines and dotted lines of FIG. 4 are extracted.

(1) Binarization

The control unit 303 performs binarization on the scan image to obtain the binarized image. By the binarization described above, for example, it is possible to obtain the binarized image in which among the pixels of the scan image, pixels whose colors are darker than a threshold value are black pixels and pixels whose colors are lighter than or equal to the threshold value are white pixels. Although in the following description, it is assumed that the scan image has 100 DPI, it is needless to say that the scan image is not limited to this resolution.

(2) Black Pixel Block Detection

Figure 5:
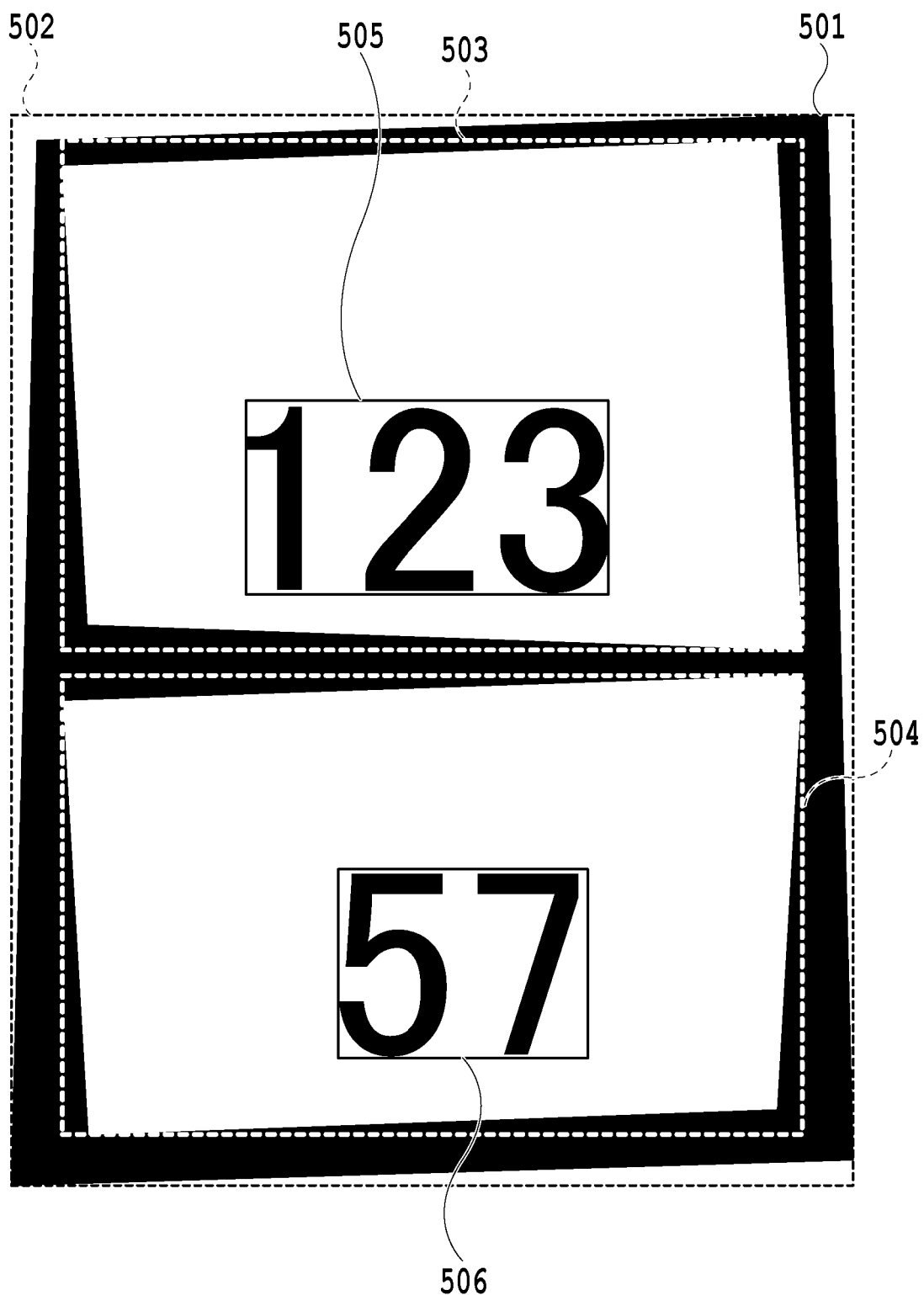
FIG. 5 is a diagram showing detection of a recognized cell that will be described in the present embodiment.

The control unit 303 tracks the outline of black pixels that are connected to the binarized image by 8-connecting, and thereby detects the block of black pixels (black pixel block) continuously present in any one of 8 directions. The 8-connecting means that in any one of 8 directions, that is, upper left, left, lower left, lower, lower right, right, upper right and upper directions, the pixels of the same color (in this case, black) are continuous. Here, 4-connecting means that in any one of 4 directions, that is, left, lower, right and upper directions, the pixels of the same color are continuous. In the black pixel block detection processing, a single black pixel where no black pixel is present in any of 8 adjacent pixels present in the 8 directions is not detected. On the other hand, black pixels where at least one black pixel is present in any one of 8 adjacent pixels present in the 8 directions are detected as the black pixel block together with the adjacent black pixels. FIG. 5 is a diagram including an example of a black pixel block 501 detected by the control unit 303. The control unit 303 calculates position information on a circumscribed rectangle of the detected black pixel block. The position information on the circumscribed rectangle refers to X, Y coordinate information on the four vertexes of the circumscribed rectangle. It is assumed that the X-axis extends in the rightward direction and that the Y-axis extends in the downward direction. The width refers to the length in the direction of the X-axis, and the height refers to the length in the direction of the Y-axis. FIG. 5 includes the circumscribed rectangle 502 of the black pixel block 501. In the case where a rectangle is expressed in the present specification, an oblique rectangle is not included, and it is assumed that a rectangle whose four sides are all parallel to any of the X coordinate axis and the Y coordinate axis.

(3) Table Region Detection

The control unit 303 determines whether the detected black pixel block satisfies predetermined conditions to detect the table region. For example, the control unit 303 determines that the black pixel block which satisfies all conditions below is a black pixel block which forms the frame lines of the table.

(a) The width and the height of the circumscribed rectangle of the black pixel block are equal to or more than a threshold value (for example, 100 pixels (0.25 cm) or more).

(b) The filling rate of the black pixel block within the circumscribed rectangle is equal to or less than a threshold value (for example, the proportion of the black pixel block in the circumscribed rectangle is 20% or less).

(c) Both a difference between the maximum width of the black pixel block and the width of its circumscribed rectangle and a difference between the maximum height of the black pixel block and the height of its circumscribed rectangle are small (for example, both the difference between the maximum width of the black pixel block and the width of its circumscribed rectangle and the difference between the maximum height of the black pixel block and the height of its circumscribed rectangle are 10 pixels or less).

The control unit 303 stores, in the storage unit 302, the position information on the circumscribed rectangle of the black pixel block that is determined to form the frame lines of the table. In the following description, the circumscribed rectangle having the position information stored in this way is referred to as the table region. Here, it is assumed that the black pixel block 501 of FIG. 5 is determined to form the frame lines of the table as a result of the determination processing from (a) to (c) described above. Hence, the circumscribed rectangle 502 is referred to as the table region. It is assumed that since in FIG. 5, numbers "123" and numbers "57" are also detected as black pixel blocks but do not satisfy the predetermined conditions described above, the circumscribed rectangles of these black pixel blocks are not detected as the table regions.

(4) Identification of a Recognized Cell

The control unit 303 identifies a cell (hereinafter referred to as a recognized cell) within the detected table region. In order to identify a recognized cell, it is necessary to track the outline of a white pixel within the table region and thereby detect a white pixel block. Then, in the case where the white pixel block satisfies predetermined conditions, the circumscribed rectangle of the white pixel block is identified as the recognized cell. FIG. 5 described above includes recognized cells 503 and 504 within the circumscribed rectangle 502 (that is, the table region). The control unit 303 stores position information on the identified recognized cells in the storage unit 302.

For example, the satisfying of the predetermined conditions indicates that all three conditions below are satisfied.

(a) The width and height of the circumscribed rectangle of the white pixel block are equal to or more than a threshold value (for example, 20 pixels).

(b) The filling rate of the black pixel block within the circumscribed rectangle is equal to or less than a threshold value (for example, the proportion of the black pixel block in the circumscribed rectangle is 20% or less).

(c) Both a difference between the maximum width of the white pixel block and the width of its circumscribed rectangle and a difference between the height of the white pixel block and the height of its circumscribed rectangle are small (for example, both the difference between the maximum width of the white pixel block and the width of its circumscribed rectangle and the difference between the height of the white pixel block and the height of its circumscribed rectangle are 5 pixels or less).

(5) Identification of a Character Region within the Recognized Cell

The control unit 303 determines whether within each recognized cell, a black pixel block surrounded by a white pixel block inscribed in each recognized cell is present. Then, in the case where the black pixel block is determined to be present, a circumscribed rectangle is set for each black pixel block that is determined to be present.

Furthermore, in the case where a plurality of circumscribed rectangles is set within one recognized cell, the control unit 303 determines whether the distance between the circumscribed rectangles is equal to or less than a threshold value (for example, 20 pixels, . . . 0.5 cm). Specifically, the control unit 303 selects the circumscribed rectangles one by one, and detects a circumscribed rectangle in which the distance from the selected circumscribed rectangle is equal to or less than the threshold value.

Furthermore, in the case where the circumscribed rectangle in which the distance from the selected circumscribed rectangle is equal to or less than the threshold value is detected, the control unit 303 integrates the detected circumscribed rectangle and the selected circumscribed rectangle. In other words, the control unit 303 sets a new circumscribed rectangle circumscribed about the both circumscribed rectangles, and instead deletes the selected circumscribed rectangle and the detected circumscribed rectangle.

After the completion of the setting of the new circumscribed rectangle and the deletion of the two circumscribed rectangles, the control unit 303 selects the circumscribed rectangles within the recognized cell one by one from the beginning, and integrates the circumscribed rectangles in which the distance therebetween is equal to or less than the threshold value. The processing described above is repeated until the circumscribed rectangles in which the distance therebetween is equal to or less than the threshold value are not present, and thus the circumscribed rectangles are integrated (coupled).

As described above, in the identification processing on a character region within the recognized cell, the circumscribed rectangles present within one recognized cell are integrated but the circumscribed rectangles straddling the recognized cell are not integrated.

The circumscribed rectangles of the black pixel block within the recognized cell that are still set even after the completion of the processing described above are referred to as the character region. The processing described above is referred to as the identification of the character region within the recognized cell. The control unit 303 associates the position information on the character region present within the recognized cell with the recognized cell and stores it in the storage unit 302.

FIG. 5 is a diagram including character regions 505 and 506. In other words, the character region 505 is associated with the recognized cell 503, the character region 506 is associated with the recognized cell 504 and the position information thereof is stored in the storage unit 302.

As described above, the result of the region division performed on the scan image of FIG. 1 is shown in FIG. 4. In FIG. 4, heavy-line frames are attached to the circumscribed rectangles indicating the identified recognized cells, and dotted-line frames are attached to the circumscribed rectangles indicating the character region. In the example of FIG. 4, the recognized cells 401, 402, 403, 404, 406 and 407 and the character region 405 are included. In the example of FIG. 4, although the other rectangles without symbols attached are also recognized cells and character regions, here, symbols are attached to only part of the recognized cells and the character regions.

Since in FIG. 4 here, the ruled lines within the recognized cell 403 are faint, the recognized cell 403 which is originally formed with a plurality of cells is identified as one recognized cell. Although the recognized cells 406 and 407 are originally a single cell, they are identified as separate recognized cells due to noise. A method of dealing with the case where as described above, a cell different from the recognized cell to be originally recognized is identified as a recognized cell will be described later.

(6) Character Recognition

The control unit 303 performs character recognition on each character region to obtain the recognized character corresponding to each character region. The recognized character is associated with the corresponding character region and is stored in the storage unit 302. The association of the recognized character with the corresponding character region results in the association of the recognized character with the recognized cell which is previously associated with the character region. In the case where the character recognition is not performed or in the case where the character recognition fails, no recognized character is associated with the character region.

The information stored in the storage unit 302 as a result of the processing from (1) to (6) described above, that is, the region division processing and the character recognition processing being performed is as follows in FIG. 5. In the recognized cell 503, the character region 505 and the recognized characters "123" are associated with each other and are stored in the storage unit 302. In the recognized cell 504, the character region 506 and the recognized characters "57" are associated with each other and are stored in the storage unit 302.

(7) Recognized Cell Frame Display

The control unit 303 displays, on the display unit 304, a screen where each recognized cell is highlighted. Specifically, the control unit 303 attaches a heavy-line frame to the four sides (that is, the four sides of the circumscribed rectangle of the white pixel block described previously) of each recognized cell, and displays the scan image on the display unit 304. As a result of the analysis of the scan image of FIG. 1, a screen on which the heavy-line frame is attached to the four sides of each recognized cell and which is displayed on the display unit 304 is FIG. 6. In other words, FIG. 6 is the screen that is displayed on the display unit 304 after the three types of processing, that is, the region division, the character recognition and the recognized cell frame display described above are performed on the scan image of FIG. 1. Although it is needless to say that there is no restriction on the form of the frame, and it is not limited to a heavy line, a solid line and black, in the following description, it is assumed that the form of the frame is a heavy line. In the processing of (7) recognized cell frame display, the scan image displayed together with the heavy-line frame is the scan image before the processing of (1)-(6) is performed, that is, the scan image before being binarized.

The processing described above is the processing that is performed in the case where the user provides an instruction to analyze the scan image, and as a result of the analysis of the scan image of FIG. 1, the screen as shown in FIG. 6 is displayed on the display unit 304.

<Description of Edition Processing within the Table Region>

Processing in which after the screen as shown in FIG. 6 is displayed on the display unit 304, the user specifies the recognized cell and performs edition within the table region will then be described.

Figure 7:
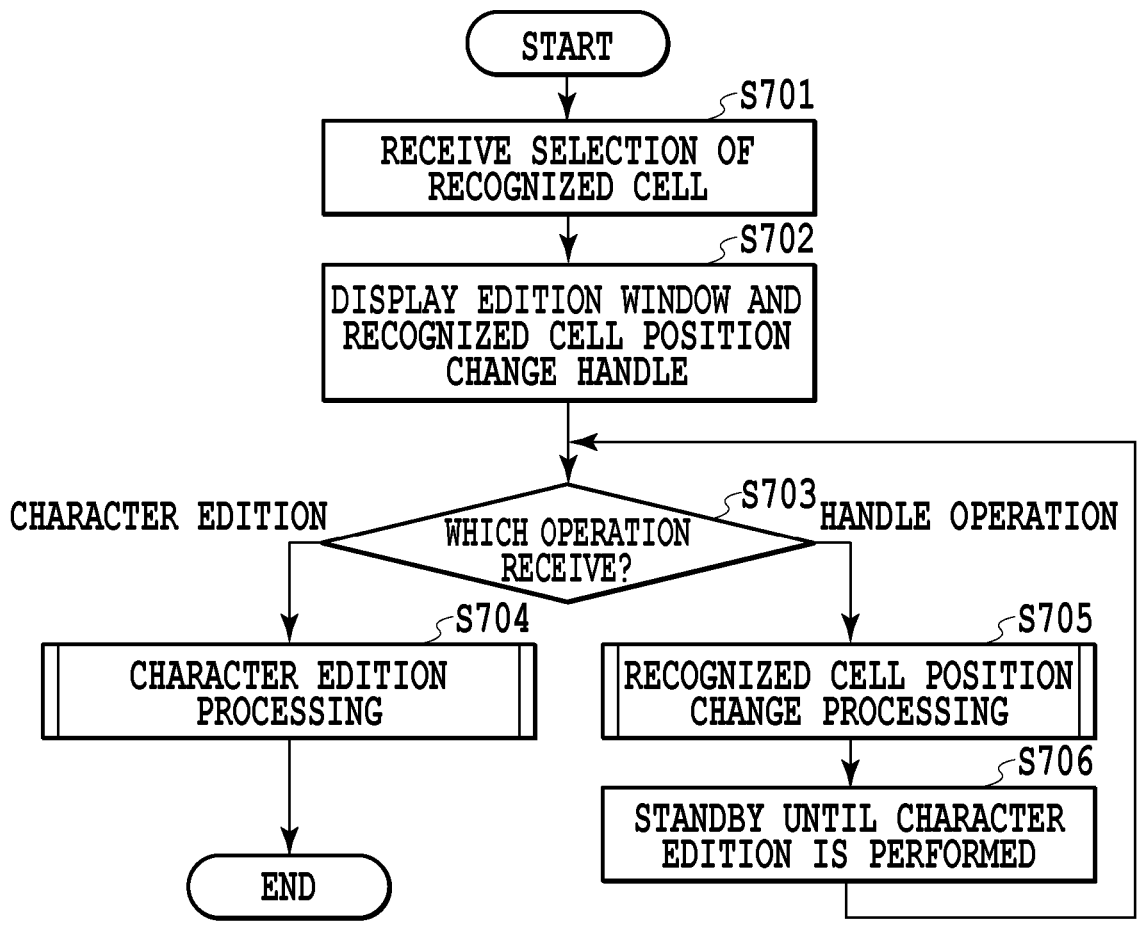
FIG. 7 is a diagram showing a main flowchart that will be described in the present embodiment.

FIG. 7 is a diagram showing a flowchart of edition processing within the table region. In step S701, the reception unit 305 receives the selection of the recognized cell from the user. For example, the user clicks, through the reception unit 305, an arbitrary area in FIG. 6 displayed on the display unit 304. The click in the present specification is an act of pressing the left button of a mouse and immediately leaving it (within a predetermined time after the pressing). In the case where the clicked area is within the circumscribed rectangle of the recognized cell, the control unit 303 determines that the recognized cell is selected.

Then, in step S702, the control unit 303 displays the edition window of the recognized cell in which the selection is received in step S701 and a handle for changing the position of the recognized cell. The edition window and the recognized cell position change handle will be described with reference to drawings.

FIG. 8 shows a display screen that is displayed in the case where a recognized cell 802 is selected. Here, a description will be given below with the assumption that the reception unit 305 receives the selection of the recognized cell 802 by the user with a mouse pointer 801.

In the case where the selection of the recognized cell is received by the reception unit 305, the control unit 303 additionally displays an edition window 804 and a handle 803 on the display unit 304. The edition window 804 is a window for editing an original character within the selected recognized cell. The handle 803 is a handle for changing the position and the size of the selected recognized cell 802. The handle 803 (referred to as the recognized cell position change handle) is additionally displayed in the four vertexes of the heavy-line frame of the selected recognized cell 802. In the example of FIG. 8, the handle 803 is displayed in the four vertexes of the recognized cell as filled rectangles. The edition window 804 is displayed at such an arbitrary position on the uppermost surface that the edition window 804 is not superimposed on the selected recognized cell.

In the display processing in step S702, as shown in FIG. 8, the selected recognized cell (the recognized cell in the selected state) is also preferably distinguished from the other recognized cells. For example, the frame of the recognized cell in the selected state is also preferably made heavier (a very heavy-line frame is also preferably used). Naturally, another method may be adopted as long as it is distinguished from the other recognized cells. For example, a method of adopting another color for the frame of the recognized cell in the selected state or a method of adopting dotted lines can be considered. However, in the present specification, a description will be given below using, as a method for distinguishing the selected recognized cell from the other recognized cells, an example of a case where a method of using a very heavy-line frame is adopted. In the case where the selected state of the recognized cell is cancelled, the state of the very heavy-line frame is returned to the original state (that is, it is returned to the same state of the heavy-line frame as in the other recognized cells).

In the edition window 804 of FIG. 8, a character input field 805, an OK button 806, an Apply button 807 and a Cancel button 808 are displayed. In the character input field 805 of the edition window 804, the recognized character associated with the selected recognized cell is displayed so as to have the edition window character size. In other words, the recognized character associated with the character region associated with the selected recognized cell is displayed (the detailed processing of the display will be described in FIG. 21). The user can delete the recognized character from the character input field 805 and instead input another character. In this way, it is possible to edit the recognized character (the detailed processing of the edition will be described in FIG. 9). There is a case where no recognized character associated with the selected recognized cell is present. For example, in the case where no character region is detected from the interior of the selected recognized cell or in the case where a character region is detected but character recognition fails and no recognized character is present, the character input field 805 is empty.

Here, the OK button 806 is a button that is clicked in the case where the character edition is fixed. The Apply button 807 is a button that is clicked in the case where it is desired to display the edited character on the scan image to check the display position of the character. Even in the case where either of the OK button 806 and the Apply button 807 is clicked, the edited character is displayed on the scan image. A basic difference between the case where the OK button is clicked and a case where the Apply button is clicked is that in the case where the OK button is clicked, the selection of the recognized cell is cancelled whereas in the case where the Apply button is clicked, the selection of the recognized cell is not cancelled. In the case where the Apply button 807 is clicked in FIG. 8, a handle for changing the position of the edited character displayed in the recognized cell is displayed. The details thereof will be described later. The Cancel button 808 is a button that is clicked in the case where it is desired to cancel the character edition.

What has been described above is the display processing in the edition window and the recognized cell position change handle in step S702. As a result of the processing in step S702, the screen as shown in FIG. 8 is displayed on the display unit 304, and thereafter the user performs a new operation on the reception unit 305. In step S703, the control unit 303 determines whether the new operation received by the reception unit 305 is the character edition or the handle operation. In other words, the control unit 303 determines whether the new operation received by the reception unit 305 is a character edition instruction or a recognized cell position change instruction. In the case where the operation received by the reception unit 305 in step S703 is determined to be the character edition in the edition window 804, the control unit 303 proceeds to the character edition processing in step S704. In the case where the operation performed on the reception unit 305 by the user is determined to be the operation on the recognized cell position change handle, the control unit 303 proceeds to the recognized cell position change processing in step S705. The determination as to whether the received operation is the character edition processing or the recognized cell position change processing is, for example, performed as follows. For example, the user clicks in the edition window 804 to make the edition window 804 active or in the case where the execution of the edition processing on the recognized character (the deletion of the character or the input of the character) is received, the control unit 303 determines that the character edition processing is received. In the case where the operation on the recognized cell position change handle 803 is received, the control unit 303 determines that the recognized cell position change processing is received.

<Description of the Character Edition Processing>

Figure 9:
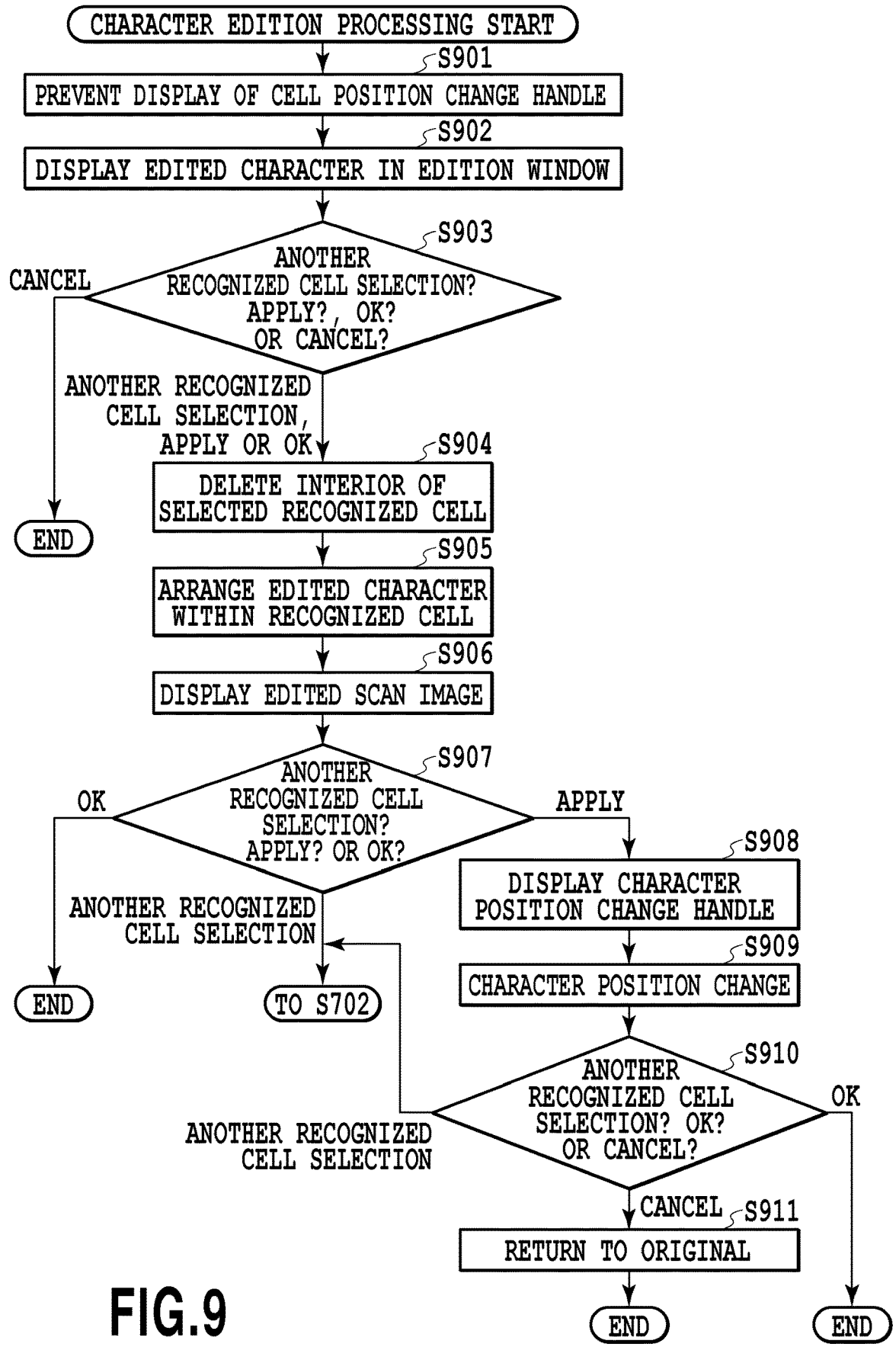
FIG. 9 is a diagram showing a flowchart of edition that will be described in the present embodiment.

The character edition processing in step S704 of FIG. 7 will then be described in detail with reference to the flowchart of FIG. 9. FIG. 9 is a diagram showing the flowchart of the character edition processing.

In step S901, the control unit 303 prevents (quits) the display of the recognized cell position change handle 803 of the selected recognized cell displayed on the screen shown in FIG. 8 in the display unit 304.

Then, in step S902, the control unit 303 displays the edited characters in the edition window 804 on the screen shown in FIG. 8 in the edition window 804 so as to have the edition window character size. In other words, step S902 is the processing after the user deletes the recognized character and instead inputs a replacement character.

In step S903, the control unit 303 determines which one of the selection of another recognized cell, the click of the Apply button, the click of the OK button and the click of the Cancel button the operation performed by the user on the reception unit 305 after the character edition is. In the case where it is determined to be the click of the Cancel button, the control unit 303 cancels the selected state of the selected recognized cell and completes the processing of FIG. 9. In other words, the edited character displayed in the edition window in step S902 is not reflected on the scan image. Although a further description will be omitted, the recognized cell in which the selected state is cancelled is, as described previously, returned from the very heavy-line frame state to the same state of the heavy-line frame as in the other recognized cells.

In the case where in step S903, it is determined to be an operation other than the click of the Cancel button, in step S904, the control unit 303 deletes all the colors within the selected recognized cell (that is, within the recognized cell in the scan image). All the colors within the circumscribed rectangle of the white pixel block, which is the original of the recognized cell, are deleted. For example, a description using the example of FIG. 5 will be given; the deletion of all the colors within the recognized cell 503 includes not only the deletion of the character region 505 within the recognized cell but also the deletion of the white pixel block and furthermore the deletion of part of the black pixel block. Here, the deletion of the color means that color information on the pixels within the recognized cell is replaced by predetermined color information. Although in the present embodiment, a description will be given with the assumption that the specified color information is white, the color is not limited to white. The specific processing in step S904 discussed above will be described later with reference to FIGS. 22A to 24B.

Then, in step S905, the control unit 303 arranges the edited character within the recognized cell whose colors therewithin are all deleted so as to have the scan image character size. Then, in step S906, the control unit 303 stores, in the storage unit 302, the edited scan image (that is, the image in which the deletion of the interior of the recognized cell and the arrangement of the edited character are completed). The scan image displayed on the display unit 304 is replaced by the scan image thus edited. In this way, the scan image thus edited is displayed in a state where the heavy-line frame is attached to the circumscribed rectangle of each recognized cell. The processing in steps S904 to S906 described above is the common processing even in the case where the operation by the user is any of the selection of another recognized cell, the click of the Apply button and the click of the OK button. The circumscribed rectangle of the recognized cell being currently selected remains displayed in the state of the very heavy-line frame.

The individual processing of each operation will then be described. In step S907, the operation by the user is determined. In the case where the operation determined in step S903 is the click of the OK button, the control unit 303 cancels the selected state of the selected recognized cell and completes the processing of FIG. 9. In other words, on the screen where the replacement by the edited scan image is performed, the recognized cell in the state of the very heavy-line frame is returned to the state where the heavy-line frame is attached, and completes the processing of FIG. 9. In the case where the operation determined in step S903 is the selection of another recognized cell, the control unit 303 cancels the selected state of the selected recognized cell, and makes the processing proceed to step S702 of FIG. 7. In other words, in the case where another recognized cell is selected, in step S702 of FIG. 7, the edition window of the another recognized cell and the recognized cell position change handle for the another recognized cell are displayed.

In the case where the operation determined in step S903 is the click of the Apply button, in step S908, the control unit 303 displays a character position change handle in the four vertexes of the circumscribed rectangle of the edited character arranged in step S905. As with the recognized cell position change handle, the character position change handle is a handle that is used in the case where the character position is changed. FIG. 10 shows a screen that is displayed in the case where the Apply button 807 is clicked after the character in the edition window 804 of FIG. 8 is edited. The characters in a recognized cell 1002 are the same as the edited characters 1001. Then, FIG. 10 differs from FIG. 8 in that instead of the recognized cell 1002, the recognized characters (that is, the character region) are displayed with the very heavy-line frame and that a character position change handle 1003 is displayed in the four vertexes of the character region.

In the case where the user desires to change the position of the edited character, an operation for moving the position of the character position change handle 1003 is performed on the reception unit 305. In the case where, in step S909, the reception unit 305 receives the change of the character position, the control unit 303 performs the character position change corresponding to the operation, and further replaces the edited scan image stored in the storage unit 302 by the image after the character position change performed, and further replaces the edited scan image being displayed. In this way, the image after the character position change is performed is stored and displayed as the edited scan image. The change of the character position means that the position information on the character region stored in the storage unit 302 is changed. On the other hand, in the case where it is not necessary to change the character position, the operation on the character position change handle is not performed. In that case, in step S909, nothing is performed, and the processing in step S909 is skipped.

Thereafter, the user selects another recognized cell, clicks the OK button or clicks the Cancel button. In step S910, the control unit 303 performs the processing corresponding to the operation of the user received by the reception unit 305. In the case where the selection of another recognized cell is received by the reception unit 305, the control unit 303 cancels the selected state of the selected recognized cell, and makes the processing proceed to step S702. In the case where the click of the OK button is received by the reception unit 305, the control unit 303 cancels the selected state of the selected recognized cell, and completes the processing of FIG. 9. In the case where the click of the Cancel button is received by the reception unit 305, in step S910, the control unit 303 returns the interior of the selected recognized cell to the original state (that is, returns it to the state before the deletion of the black pixel block in step S904). Then, the control unit 303 cancels the selected state of the selected recognized cell and completes the processing of FIG. 9. In the case where the operation of the user received by the reception unit 305 in step S910 is the click of the Apply button, the processing is returned to step S908 but this processing is omitted in FIG. 9.

After the completion of the processing of FIG. 9, the state is brought into a state where the selection of another recognized cell by the user is waited for. In the case where the user instructs the reception unit 305 to transmit the edited scan image to another apparatus, the control unit 303 cancels the state where the selection is waited for. Then, the control unit 303 makes the transmission/reception unit 301 transmit the edited scan image stored in the storage unit 302 to another apparatus. In the case where the another apparatus is the MFP 200, the MFP 200 receives the edited scan image with the transmission/reception unit 202, and prints the edited scan image with the printer 203 depending on an instruction from the user.

In the case where the processing described above is performed, the edited scan image transmitted to another apparatus is an image in which the deletion of the interior of the recognized cell and the arrangement of the edited character are completed. However, the image transmitted is not necessarily limited to this. For example, it may be a file that includes the original scan image (the scan image before being binarized), an instruction to delete the interior of the recognized cell and an instruction to arrange the edited character. In the case where such a file is received by another apparatus, on the side of the another apparatus, the deletion of the interior of the recognized cell from the original scan image and the arrangement of the edited character are performed. Naturally, position information for identifying the recognized cell may be included or analysis processing on the scan image itself may be performed by another apparatus.

<Description of the Arrangement Processing on the Edited Character>

Figure 11:
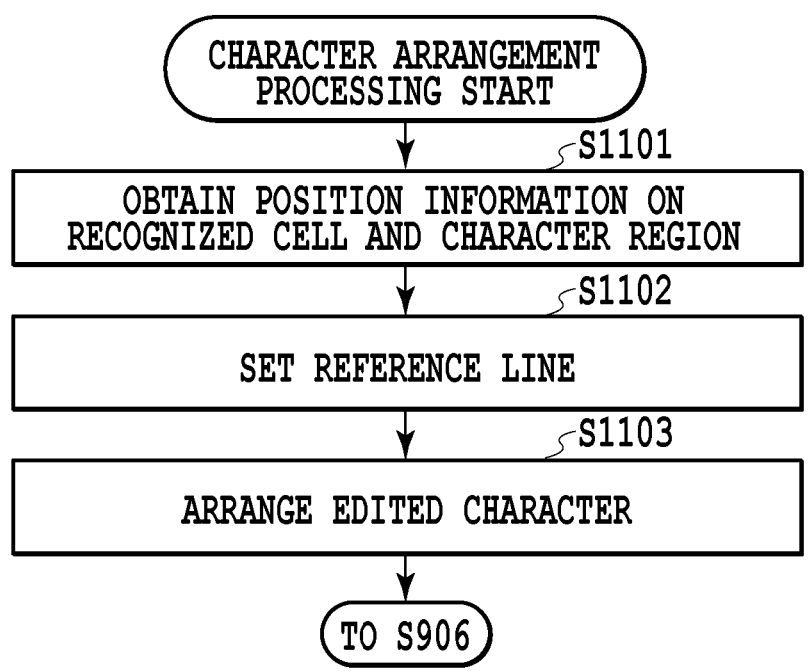
FIG. 11 is a diagram showing a display flow of the characters after the edition that will be described in the present embodiment.

Processing that arranges the edited character within the recognized cell in step S905 will then be described in detail with reference to FIG. 11.

In step S1101, the control unit 303 obtains, from the storage unit 302, the position information on the selected recognized cell and the position information on the character region associated with the recognized cell.

Then, in step S1102, the control unit 303 uses the position information obtained in step S1101 to set a reference line. The reference line is a line that is used as a reference in the case where the character is arranged, and for example, in the case where the reference line is set on the right side of the character region, the edited character is arranged so as to be displaced to the right side of the character region.

It is assumed that the upper left coordinates and the lower right coordinates of the recognized cell are (X1, Y1) and (X2, Y2), respectively, and that the upper left coordinates and the lower right coordinates of the character region are (x1, y1) and (x2, y2), respectively. In order to set the reference line, the control unit 303 calculates margins on the left and right of the character region in the selected recognized cell as follows. As described previously, it is assumed that the X-axis extends in the rightward direction, and that the Y-axis extends in the downward direction. In other words, as the x coordinate is moved rightward, it is increased whereas as the y coordinate is moved downward, it is increased.

The margin on the left side x1-X1
The margin on the right side X2-x2

Then, in the case where (the margin on the left side)≥(the margin on the right side), the reference line is set at the right side of the character region, that is, a straight line connecting (x2, y1) and (x2, y2). By contrast, in the case where (the margin on the left side)<(the margin on the right side), the reference line is set at the left side of the character region, that is, a straight line connecting (x1, y1) and (x1, y2).

In step S1103, the control unit 303 arranges the edited character such that it coincides with the set reference line interior of the selected recognized cell. Here, although it is assumed that as the size of the character arranged, the default value of the scan image character size is used, the size that is determined as follows may be used. For example, in the case where the width of four original characters present within the selected recognized cell is 100 dots, it is estimated that the size of one character is 25 dots. In order for the edited character to be arranged within the recognized cell without discomfort, the edited character preferably has a size of about 25 dots per character. Hence, by calculating the number of points such that the standard character size is 25 dots, it is also possible to use the number of points as the size of the character arranged. A configuration may be adopted in which the character size determined in this way can be manually changed by the user. Furthermore, a configuration may also be adopted in which the color, the font and the style (standard, italic or bold) of the character arranged can be manually changed by the user.

Here, it is assumed that the height of the circumscribed rectangle of the edited character is H, and that the width thereof is W. It is also assumed that the upper left coordinates of the character region stored in the storage unit 302 are (x1, y1) and the lower right coordinates thereof are (x2, y2), and that the reference line determined in step S1102 is the right side of the character region.

In this case, the coordinates where the circumscribed rectangle of the edited character is arranged are the upper left coordinates (x2−W, y2−H), the lower right coordinates (x2, y2).

In the case where the reference line is the left side, in order for the left side of the circumscribed rectangle of the edited character to be made to coincide with the reference line (the left side of the character region), the coordinates where the edited character is arranged are the upper left coordinates (x1, y2−H), the lower right coordinates (x1+W, y2).

In these examples, the position of the edited character in the direction of the height (Y direction) is set with respect to the position of the lower side of the character region where the original character is arranged. However, instead of such a positon, the position of the edited character may be determined such that the center of the edited character in the direction of the height and the center of the character region, in the direction of the height, where the original character is arranged are aligned.

<Description of the Recognized Cell Position Change Processing>

Then, with reference back to FIG. 7, the recognized cell position change processing in step S705 will be described in detail. In the case where as described above, the operation performed in step S703 by the user on the reception unit 305 is the operation on the recognized cell position change handle 803, the control unit 303 makes the processing proceed to step S705.

In step S705, the control unit 303 changes the position of the recognized cell according to the operation thereof, brings the four sides of the recognized cell at the position after being changed into the state of the very heavy-line frame and displays it on the display unit 304. Here, the state of the very heavy-line frame of the four sides of the recognized cell at the position before being changed is cancelled, and is returned to the normal state (the state where neither the heavy-line frame nor the very heavy-line frame is attached). The recognized cell position change handle 803 is likewise cancelled from the four vertexes of the recognized cell at the position before being changed, and is displayed in the four vertexes at the position after being changed. The change of the position of the recognized cell means the change of the position information on the recognized cell stored in the storage unit 302.

Thereafter, the control unit 303 is placed on standby until the character edition through the edition window 804 is performed, and in the case where the character edition is performed, the control unit 303 makes the processing proceed to the character edition processing in step S704, that is, step S901 in FIG. 9 described above.

As described above, the position of the recognized cell can be changed before the character edition is performed, and thus in step S904 of the character edition processing, the position of the recognized cell which is a target where its interior is deleted can be changed. In this way, a part which needs to be deleted is deleted, and a part which is not to be deleted is not deleted.

<Description of Coupling and Division Processing on Recognized Cells>

By the recognized cell position change processing in step S705, the recognized cells may be coupled or divided. The coupling and division processing on the recognized cells will be described in detail.

Figure 12:
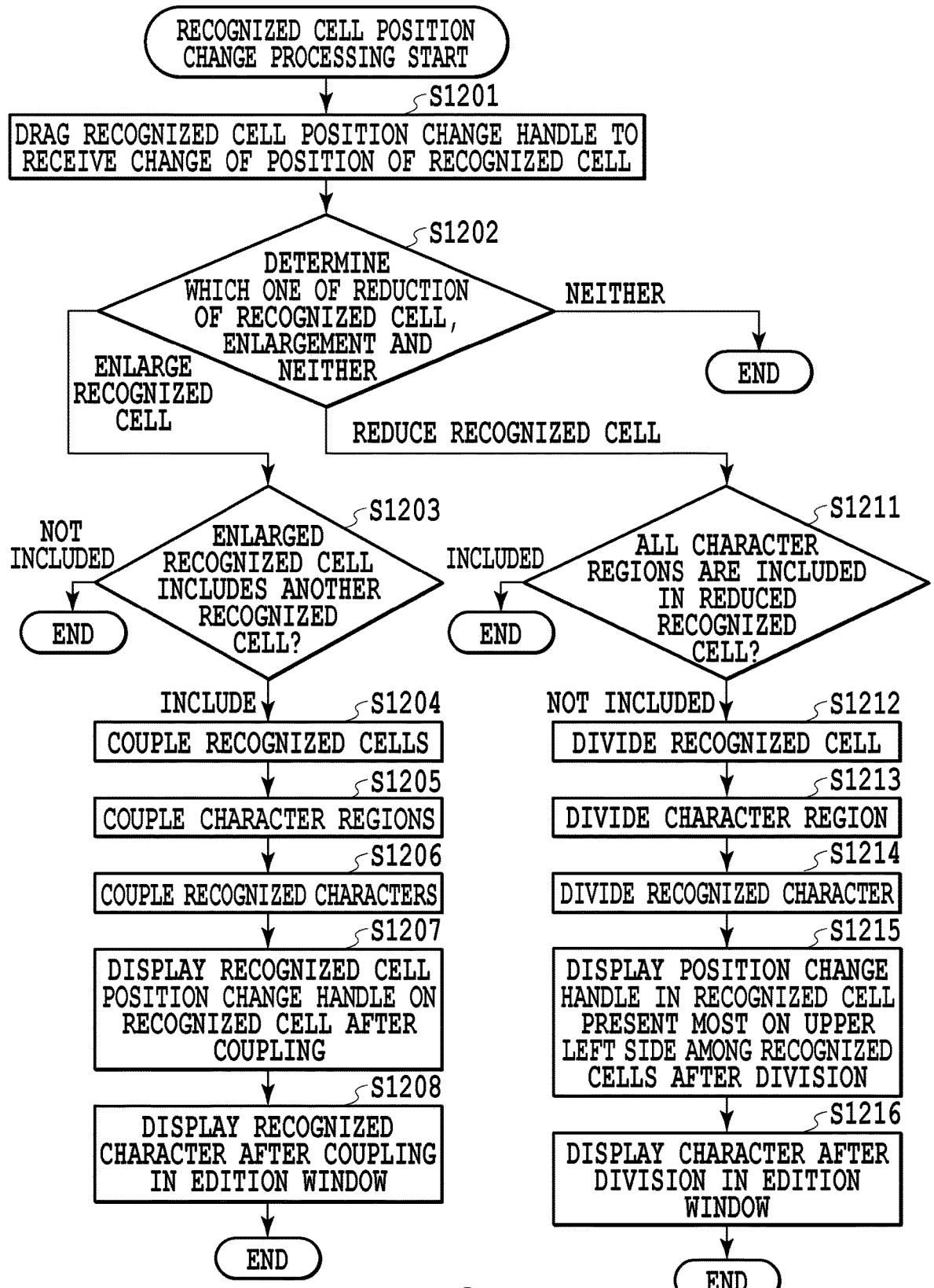
FIG. 12 is a diagram showing a flowchart coupling or dividing the recognized cell that will be described in the present embodiment.

Although in FIG. 4 described previously, the recognized cell 406 and the recognized cell 407 are originally a single cell, they are identified as separate recognized cells due to noise. The processing that couples the recognized cell 406 and the recognized cell 407 to forma single recognized cell will be described with reference to FIG. 12. FIG. 12 is a diagram showing the details of the recognized cell position change processing in step S705 of FIG. 7.

In step S1201, the reception unit 305 first receives the change of the position of the recognized cell by dragging the recognized cell position change handle. In other words, the reception unit 305 detects that the user drags the recognized cell position change handle through the reception unit 305 to change the position of the recognized cell being selected.

In step S1202, the control unit 303 determines to which one of a case where the recognized cell being selected is reduced, a case where it is enlarged and a case where it is neither reduced nor enlarged the changed position detected in step S1201 through the reception unit 305 corresponds. A specific determination method will be described below. It is assumed that the width of the recognized cell before the change of its position is W1 and the height thereof is H1, and that the width of the recognized cell after the change of the position is W2 and the height thereof is H2. In the case where W1<W2 and H1<H2, the control unit 303 determines that the recognized cell is enlarged. In the case where W1>W2 and H1>H2, the control unit 303 determines that the recognized cell is reduced. In the case other than the cases described above, the control unit 303 determines that the recognized cell is neither reduced nor enlarged. In the case where it is determined that the recognized cell is neither reduced nor enlarged, the control unit 303 changes position information on the target recognized cell stored in the storage unit 302, and completes the recognized cell position change processing. Thereafter, the processing proceeds to step S705 in FIG. 7.

In the case where the recognized cell is enlarged, in step S1203, the control unit 303 determines whether or not the enlarged recognized cell includes another recognized cell. In the case where it is determined that another recognized cell is not included, the control unit 303 does not couple the recognized cells, changes the position information on the target recognized cell stored in the storage unit 302 and completes the processing.

On the other hand, in the case where it is determined in step S1203 that another recognized cell is included, in step S1204, the control unit 303 couples the enlarged recognized cell and the another recognized cell included in this enlarged recognized cell.

In the step of coupling the recognized cells in step S1204, based on the coordinates of the individual recognized cells before being coupled, the control unit 303 sets the minimum rectangle including both the recognized cells as the recognized cell after the coupling. Then, the control unit 303 stores position information on the set recognized cell after the coupling in the storage unit 302. For example, it is assumed that the upper left coordinates of the two recognized cells to be coupled are individually (Xa, Ya) and (Xb, Yb), and if Xa>Xb and Ya<Yb, the upper left coordinates of the recognized cell after the coupling are (Xb, Ya). The lower left, the upper right and the lower right coordinates are determined in the same manner. The same is true in the case where three or more recognized cells are coupled. Position information on the recognized cell after the coupling is associated with position information on a plurality of recognized cells before being coupled (position information on the recognized cell before the operation of the recognized cell position change handle and the recognized cell on which the recognized cell position change handle is operated and position information on the another recognized cell) and is stored. After the coupling processing on the recognized cells, the recognized cell after the coupling is operated as a normal recognized cell that is not coupled is operated. The reason why the position information on the recognized cells before being coupled is associated with the recognized cell after the coupling and is stored is that in the case where the character edition processing is performed thereafter, it may be used for the deletion of the interior of the recognized cell in step S904 described previously.

Then, in step S1205, the control unit 303 couples character regions included in the individual recognized cells. Specifically, the control unit 303 detects the character regions included in the recognized cell after the coupling. The character regions detected here are the character region included in the recognized cell before being enlarged and the character region included in the another recognized cell.

Then, the detected character regions are coupled to each other. The character region after the coupling is the minimum rectangle that includes all the character regions before being coupled. Position information on the minimum rectangle is associated, as the position information on the character region after the coupling, with the recognized cell after the coupling and is stored in the storage unit 302. Then, instead, the position information on the character region included in the recognized cell before being enlarged and the position information on the character region included in the another recognized cell are deleted from the storage unit 302. At this time, since the character regions before being coupled are not used for the deletion of the interior of the recognized cell in step S904 described previously, they are deleted here.

Then, in step S1206, the control unit 303 couples the recognized characters. Specifically, the control unit 303 couples a plurality of recognized characters included in the character region after the coupling to newly form one recognized character. Instead, the plurality of original recognized characters are deleted. The newly formed recognized character is associated with the character region after the coupling by the control unit 303. In the coupling of the recognized characters, a plurality of recognized characters may be simply connected or a space may be inserted between the recognized characters.

Then, in step S1207, the control unit 303 deletes the recognized cell position change handles from the four vertexes of the recognized cells before being coupled, and displays the recognized cell position change handle in the four vertexes of the recognized cell after the coupling. In other words, the state is brought into a state where the recognized cell after the coupling is selected. In step S1208, the control unit 303 displays the recognized character after the coupling in the character input field 805 in the edition window 804. In the case where the processing in step S1208 is completed as described above, the recognized cell after the coupling is selected, and the recognized character after the coupling is displayed in the edition window. In other words, the same state as the state where the processing in step S702 of FIG. 7 completed is present. Thereafter, the processing as described previously is performed by the determination in step S703 of FIG. 7.

The coupling processing on the recognized cells described above will be specifically indicated with reference to FIGS. 13 to 16. FIG. 13 is a display screen in the case where the recognized cell 406 is selected by the user from the recognized cell 406 and the recognized cell 407 identified as separate recognized cells due to noise. Since the recognized cell 406 and the recognized cell 407 are identified as separate recognized cells, in a character input field 1301, as the recognized character, "Gym" is displayed instead of "Gym Bag."

In the case where it is desired to couple the recognized cell 406 and the recognized cell 407, the user first drags the recognized cell position change handle 803 of the recognized cell 406 and enlarges it until the entire recognized cell 407 is included (S1201). FIG. 14 shows how the user drags the recognized cell position change handle 803 with the mouse pointer 801 in the rightward direction and enlarges it until the entire recognized cell 407 is included. In the case where the recognized cell is dragged and enlarged, in order to find that the recognized cell is in the process of being enlarged, it is preferable to change the display of the frame of the recognized cell. For example, like dotted lines 1401, while the recognized cell is being enlarged, the frame of the recognized cell is displayed with dotted lines.

Figure 15:
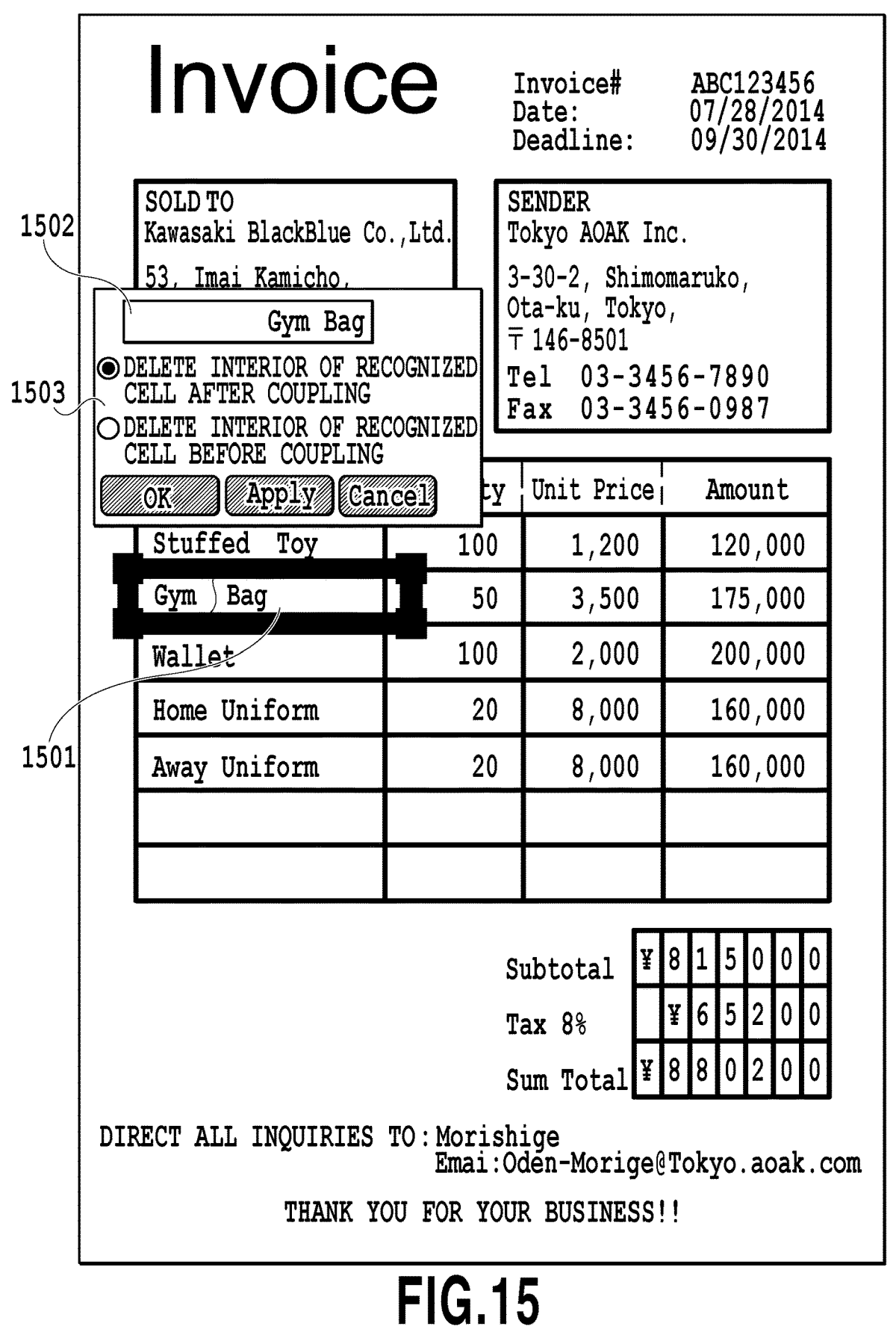

In the case where the user completes the dragging of the recognized cell position change handle 803, the control unit 303 couples the recognized cell 406 and the recognized cell 407 and displays, as shown in FIG. 15, the recognized cell 1501 after the coupling on the display unit 304. The character regions are also coupled. Furthermore, the recognized characters are coupled, and the recognized character "Gym Bag" after the coupling is displayed as the recognized character in a character input field 1502 in the edition window (steps from S1203 to S1208).

Incidentally, in the case where as with the recognized cell 1501 after the coupling, the recognized cells identified as the separate recognized cells due to noise are coupled, in the deletion of the interior of the recognized cell in step S904 of the character edition processing, it is preferable to delete the interior of the recognized cell after the coupling. This is because in the case where the interiors of the recognized cells before being coupled are deleted, the noise is left without being deleted.

On the other hand, there is a case where it is preferable to delete the interiors of the recognized cells before being coupled without the deletion of the interior of the recognized cell after the coupling. FIG. 16 shows an example where it is preferable to delete the interiors of the recognized cells before being coupled. FIG. 16 shows a recognized cell 1601 after recognized cells (six cells whose recognized characters are "¥", "8", "1", "5", "0" and "0") identified as six separate recognized cells are coupled as one recognized cell. The six recognized cells are identified as the separate recognized cells by ruled lines for dividing the digits of the numbers. In this case, the coupling of the recognized cells is performed in order to facilitate the edition of the recognized characters. Since the ruled lines mean "the division of the digits of the numbers", in the case where the deletion of the interior of the recognized cell in step S904 of the character edition processing is performed, it is preferable to maintain the ruled lines for dividing the digits. This is because in the deletion of the interior of the recognized cell in step S904, in the case where the interior of the recognized cell after the coupling is deleted, the ruled lines for dividing the digits are also deleted. Hence, in the case of the FIG. 16, in order to maintain the ruled lines for dividing the digits, it is preferable to delete the interiors of the recognized cells before being coupled.

As described above, there is a case where as the recognized cell that is the target to be deleted, the interior of the recognized cell after the coupling is preferably deleted or there is a case where the interiors of the recognized cells before being coupled are preferably deleted. In order to deal with these two cases, for example, as shown in FIGS. 15 and 16, a UI for prompting the user to determine which one of them is regarded as the target to be deleted is displayed. In other words, in the case where the coupling of the recognized cells is performed and the recognized cell after the coupling in step S1208 is displayed, a UI 1503 with which the user can select either of the "deletion of the interior of the recognized cell after the coupling" and the "deletion of the interiors of the recognized cells before being coupled" is displayed in the edition window. The UI 1503 is a radio button in which in the case where either of them is in the selected state, the other is in the non-selected state. In the initial state, the "deletion of the interior of the recognized cell after the coupling" is selected. Information on which one of the "deletion of the interior of the recognized cell after the coupling" and the "deletion of the interiors of the recognized cells before being coupled" is selected is associated with the recognized cell and is stored in the storage unit 302, and is obtained in the case of the deletion of the interior of the recognized cell in step S904. In the case where the display processing in step S1208 is performed, the recognized cell position change processing is completed. Thereafter, the processing proceeds to step S706 in FIG. 7. Here, for example, in the case where the edition of the recognized character in the edition window 1502 is performed, the processing transfers to the character edition processing in step S704 from step S706 in FIG. 7 through step S703. In the case where the OK button, the Apply button or the Cancel button of the UI 1503 is pressed, the processing likewise transfers to the character edition processing in step S704. Thereafter, the same character edition processing as described with reference to FIG. 9 is performed. Step S901 or S902 in FIG. 9 may be skipped in the case where the edition in the edition window 1502 is not performed.

For example, it is assumed that the OK button is clicked in the state of FIG. 15. Then, the processing proceeds from step S903 to step S904, and in the processing of step S904, the interior of the recognized cell after the coupling is deleted. In the case where the Apply button is clicked in the state of FIG. 15, the interior of the recognized cell after the coupling is likewise deleted. As described previously, the difference between the case where the Apply button is clicked and the case where the OK button is clicked is whether or not the recognized cell remains in the selected state.

The division of the recognized cell will then be described. In FIG. 17, the recognized cell 403 needs to be originally formed into four recognized cells that include recognized characters "Description", "Quantity", "Unit Price" and "Amount." However, since the ruled lines of the scan image are faint, the recognized cell 403 is identified as one recognized cell. In the edition window, these four recognized characters are also displayed in a character input field 1701. Processing that divides the recognized cell 403 into a plurality of recognized cells will be described using steps S1211 to S1216 in FIG. 12.

In the case where in step S1202, the control unit 303 determines that the recognized cell is reduced, in step S1211, the control unit 303 determines whether or not all the character regions included in the recognized cell being selected are also included in the reduced recognized cell. In the case where all the character regions are determined to be included, the control unit 303 does not divide the recognized cell being selected, changes position information on the target recognized cell stored in the storage unit 302 and completes the processing.

On the other hand, in the case where in step S1211, a character region that is not included in the reduced recognized cell is determined to be present, in step S1212, the control unit 303 divides the recognized cell before being reduced. In other words, in the case where part or all of the character regions included in the recognized cell before being reduced is not included in the recognized cell after the reduction, the recognized cell before being reduced is divided. The division of the recognized cell before being reduced specifically means that the control unit 303 newly forms a recognized cell separately from the recognized cell after the reduction.

Position information on the recognized cell after the reduction and the newly formed recognized cell is determined by the control unit 303 based on position information on the recognized cell after the reduction and position information on the recognized cell before being reduced. For example, it is assumed that the recognized cell before being reduced is the upper left coordinates (Xa1, Ya1) and the lower right coordinates (Xa2, Ya2). It is assumed that the user drags the recognized cell position change handle in the lower right part to reduce the recognized cell in the leftward direction, and consequently the lower right coordinates are changed to (Xa2−W, Ya2) (where W is the width of the reduction). In this case, the control unit 303 determines that the recognized cell before being reduced is divided at the position of "X coordinate=(Xa2−W)." As a result of the division, the coordinates of the recognized cell after the reduction are the upper left coordinates (Xa1, Ya1) and the lower right coordinates (Xa2−W, Ya2), and the coordinates of the newly formed recognized cell are the upper left coordinates (Xa2−W, Ya1) and the lower right coordinates (Xa2, Ya2).

Then, in step S1213, the control unit 303 divides the character region. Specifically, the association of the character region that is not included in the recognized cell after the reduction with the recognized cell after the reduction is cancelled, and instead, the character region is newly associated with the newly formed recognized cell. In the case where the character region is overlapped on the position where the recognized cell is divided, the character region is also divided at the position where the division is performed. It is assumed that the character region of the upper left coordinates (Xa3, Ya3) and the lower right coordinates (Xa4, Ya4) is divided at the position where the X coordinate is Xa5. In this case, two character regions, that is, the character region of the upper left coordinates (Xa3, Ya3) and the lower right coordinates (Xa5, Ya4) and the character region of the upper left coordinates (Xa5, Ya3) and the lower right coordinates (Xa4, Ya4) are formed. Then, the original character region is deleted by the control unit 303. Thereafter, the control unit 303 associates the newly formed two character regions with the recognized cells that include the character regions.

Then, in step S1214, the control unit 303 divides the recognized character. The recognized character is divided so as to be included in the divided character regions, and is associated with each of the character regions.

Then, in step S1215, the control unit 303 displays the recognized cell position change handle in the four vertexes of the recognized cell that is present most on the upper left side among the recognized cells after the division in the display unit 304. In other words, among a plurality of recognized cells generated after the division, the recognized cell located most on the upper left side is brought into the selected state. In step S1216, the control unit 303 displays the recognized character associated with the recognized cell after the division brought into the selected state in step S1215 in the character input field in the edition window.

The division processing on the recognized cell described above will be specifically indicated using FIGS. 17, 18 and 19. FIG. 17 is a display screen in a state where the recognized cell 403 is selected. Although the recognized cell 403 needs to be originally formed with a plurality of recognized cells, since the ruled lines of the scan image are faint, the recognized cell 403 is identified as a single recognized cell. Since the recognized cell 403 is identified as a single recognized cell, in the character input field 1701, all the recognized characters in the recognized 403 are coupled and displayed.

In the case where it is desired to divide the recognized cell 403, as shown in FIG. 18, the user first drags the recognized cell position change handle 803 to reduce the recognized cell down to the position where the recognized cell is divided. In the case where the recognized cell is dragged and reduced, in order to find that the recognized cell is in the process of being reduced, it is preferable to change the display of the frame of the recognized cell. For example, as dotted lines 1801, while the recognized cell is being reduced, the frame of the recognized cell is displayed with dotted lines. In the recognized cell after the division in FIG. 18, only the character region of the recognized character "Description" is included, and the "Quantity", the "Unit Price" and the "Amount" are not included. Hence, in step S1511 described previously, the control unit 303 determines that the character region which is not included in the recognized cell after the reduction is present, and divides the recognized cell.

After the division of the recognized cell, the control unit 303 brings, among the divided recognized cells, the recognized cell 1902 that is located most in the upper left part into the selected state. FIG. 19 shows an example where the recognized cell located in the upper left part is brought into the selected state. The control unit 303 displays, in a character input field 1901, the recognized character "Description" included in the recognized cell after the division. The state of FIG. 19 described above is an example where the edition window and the recognized cell position change handle are displayed similarly as the processing in step S702 of FIG. 7 has been performed. Hence, the subsequent processing is performed according to the processing after step S703 in FIG. 7. In the example of FIG. 19, the remaining recognized cells (that is, the recognized cells newly formed by the division) of the recognized cell 1902 are in a state where one which needs to be originally a plurality of recognized cells is formed into one recognized cell. Hence, the user repeats the same processing, and can likewise divide the remaining recognized cells.

<Selection of the Recognized Character Displayed in the Edition Window>

Then, selection processing performed in step S702 of FIG. 7 by the control unit 303 on the recognized character to be displayed in the edition window will then be described. As a result of the detection of the character region in the region analysis, there is a case where a plurality of character regions is present within one recognized cell. Specifically, it is the case of the recognized cell 401 or the recognized cell 402 in FIG. 4. In such a case, the display of all the recognized characters associated with the recognized cell in the edition window may degrade the convenience of the user. Hence, it is necessary to select the recognized character to be displayed in the edition window according to the positional relationship of the character region within the recognized cell.

Figure 20B:
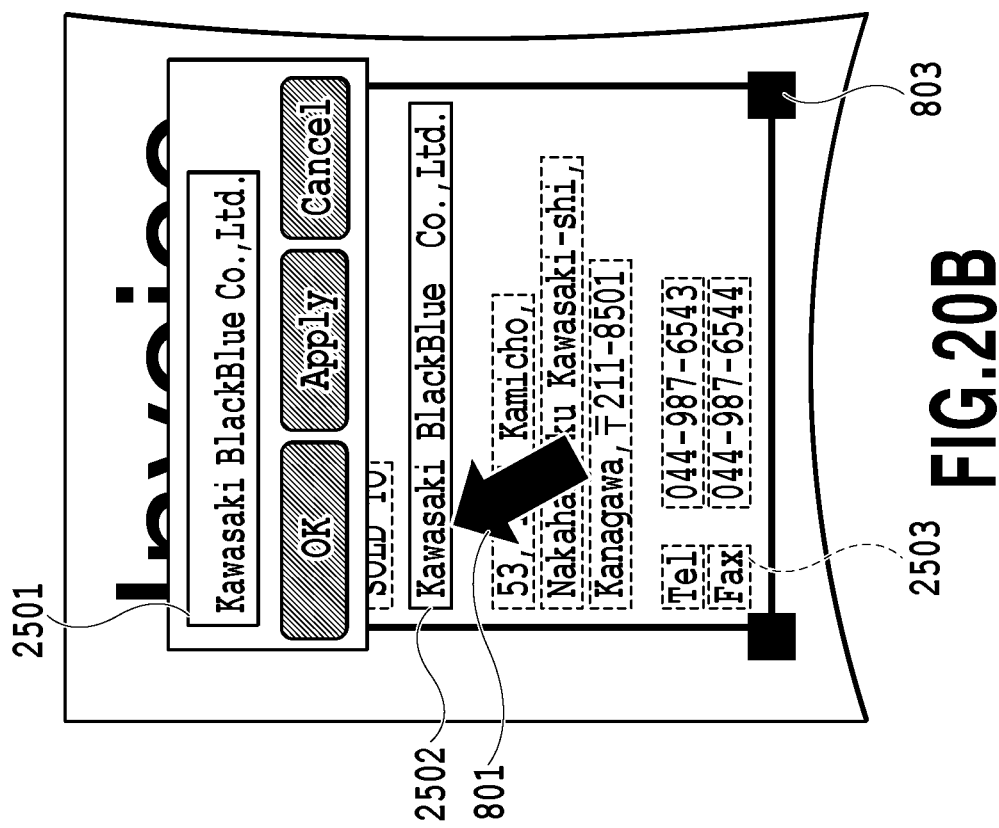
FIGS. 20A and 20B are diagrams showing an example of a display screen displayed after processing of the selection of the recognized cell that will be described in the present embodiment.
Figure 20A:
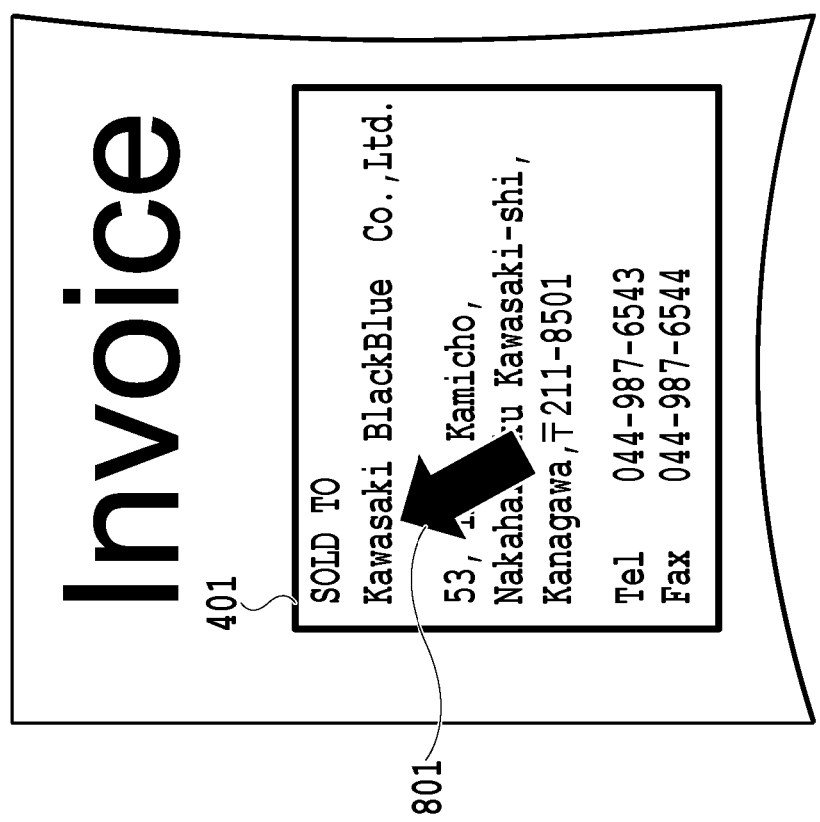
Figure 21:
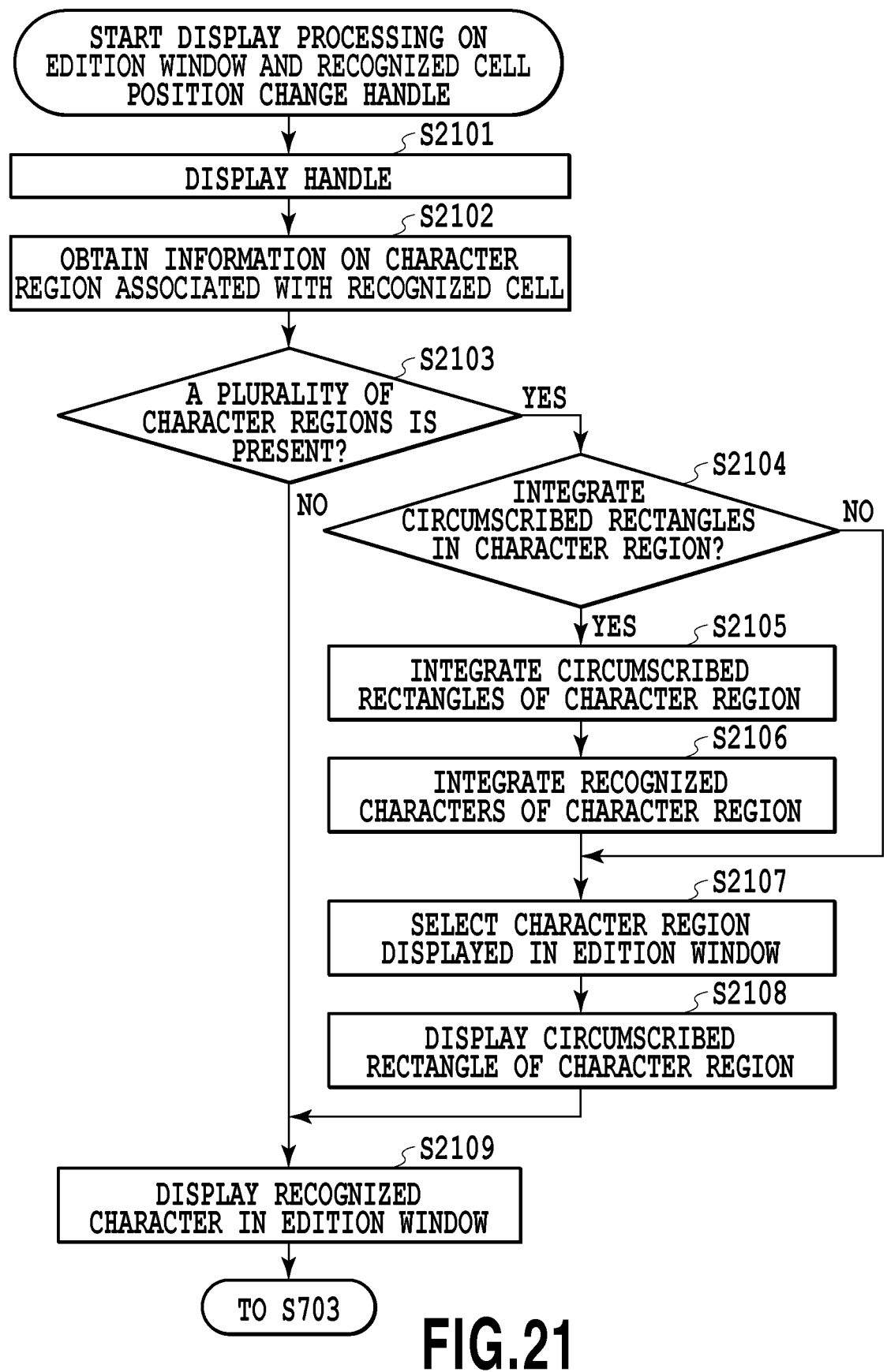
FIG. 21 is a diagram showing an example of a flowchart for selection of the recognized cell displayed on an edition window that will be described in the present embodiment.

FIG. 20A is a diagram showing part of FIG. 5 which is a display screen displaying the frame of the recognized cell. For ease of understanding, the recognized cell 401 in FIG. 4 is attached as a symbol. Processing that is performed by the control unit 303 as a result of a click by the user in the case where the mouse pointer 801 is located at the position of FIG. 20A, that is, the details of step S702 in FIG. 7, is shown in the flowchart of FIG. 21. The state of the display unit 304 after this processing is performed is shown in FIG. 20B.

The detailed processing will be described based on the flowchart of FIG. 21. In step S2101, the control unit 303 displays the recognized cell position change handle. In FIG. 20B, it corresponds to the recognized cell position change handle 803.

Then, in step S2102, the control unit 303 obtains position information on the character region associated with the recognized cell from the storage unit 302. Then, in step S2103, the control unit 303 determines whether a plurality of character regions is obtained in step S2102. In the case where one character region is obtained, in step S2109, the control unit 303 displays the recognized character of the character region as it is in the edition window. On the other hand, in the case where two or more character regions are obtained, the processing from step S2104 through step S2107 is performed to determine which one of the character regions and the recognized characters thereof are displayed.

In step S2104, the control unit 303 first determines, from position information on the circumscribed rectangles of the character regions, whether or not the circumscribed rectangles of the character regions are integrated. It is assumed that the upper right coordinates of the circumscribed rectangle A of the character region which is the comparison target are (L_a, T_a) and the lower left coordinates thereof are (R_a, B_a) and that the upper right coordinates of the circumscribed rectangle B are (L_b, T_b) and the lower left coordinates thereof are (R_b, B_b), and the integration determination conditions are as follows.

In the case where the two circumscribed rectangles A and B are not overlapped in the lateral direction, which is the row direction, that is, in the case of B_a<T_b, they are not coupled.

Otherwise, in the case of (B_a≥T_b), in the case where the two circumscribed rectangles are sufficiently away from each other, that is, in the case where L_b−R_a is equal to or more than a threshold value (for example, 20 pixels . . . 1 cm), they are not coupled.

Then, in step S2105, the control unit 303 couples the circumscribed rectangles of the character regions which are determined to be integrated, and furthermore in step S2106, the control unit 303 also integrates the recognized characters.

A specific example of the processing in steps S2104 to S2106 is shown. Ten character regions below are present within the recognized cell 401 as follows:
  SOLD TO—(1)
  Kawasaki BlackBlue—(2)
  Co., Ltd.—(3)
  53, Imai Kamicho,—(4)
  Nakahara-ku Kawasaki-shi,—(5)
  Kanagawa, T 211-8511—(6)
  Tel—(7)
  044-987-6543—(8)
  Fax—(9)
  044-98706544—(10)

The control unit 303 to which position information on these character regions is input determines that the two character regions, that is, the "Kawasaki BlackBlue" and "Co., Ltd." are integrated, and integrates the circumscribed rectangles and the recognized characters of the character regions.

Then, in step S2107, the control unit 303 selects the character regions to be displayed in the edition window 804. Selection conditions are as follow.

In the case where the position of the mouse pointer 801 is within a certain character region, the character region is selected.

Furthermore, in the case where the position of the mouse pointer 801 is not within any character region, the character region closest to the position of the mouse pointer 801 is selected.

Then, in step S2108, the control unit 303 displays, on the display unit 304, the frame of the circumscribed rectangle of the integrated character region. This is done in order to clearly indicate, to the user, which one of a plurality of character regions within the recognized cell can be selected.

In the case where the number of character regions after the integration processing is 1, the frame display processing may be skipped so that only one character region is fixed.

In step S2107, in order for the character region selected by the control unit 303 to be distinguished from the other character regions, the method of displaying the frame is changed. Although in the present embodiment, the heavy-line frame is used for a character region 2502 selected as shown in FIG. 20B and the thin-line frame is used for the other character regions 2503, as long as both can be distinguished by the display, the display method is not limited.

In step S2109, the control unit 303 displays, in the edition window, the recognized character associated with the selected character region. In FIG. 20B, the selected character region 2502 is shown, and the recognized characters "Kawasaki BlackBlue Co., Ltd." associated with the character region 2502 are displayed in the edition window.

<Details of the Deletion of the Interior of the Recognized Cell>

Details of the deletion processing on the interior of the selected recognized cell in step S904 of FIG. 9 will then be described.

In the scan image, one actual cell corresponding to the recognized cell is present. In the following description, the actual cell in the scan image is simply referred to as a cell. As described in FIG. 5, the position information on the recognized cell stored in the storage unit 302 is the information on the coordinates of the circumscribed rectangle. By the inclination and the distortion of the scan image, the information on the coordinates of the circumscribed rectangles of the recognized cells 503 and 504 and the position of the ruled lines of the cells (the black pixel block 501) do not completely coincide with each other as shown in FIG. 5. In the case where part of the ruled lines of the cell is included in the circumscribed rectangle of the recognized cell, the deletion of all the interior of the recognized cell may cause the part of the ruled lines of the cell to be deleted. A step of deleting the parts other than the ruled lines of the cell within the recognized cell without deleting the ruled lines of the cell will be described below.

FIGS. 22A to 22F are diagrams showing an example of the detection of straight lines inscribed in a cell. FIG. 22A shows an actual cell 2214 in the scan image. FIG. 22A shows that the cell 2214 is a region formed by four ruled lines connecting four vertexes 2210 to 2213. FIG. 22B shows a recognized cell 2201 corresponding to the cell 2214. FIG. 22C shows straight lines 2202 to 2205 inscribed in the cell 2214. The straight line inscribed in the cell is referred to as a cell-inscribed straight line. For one cell, there are four cell-inscribed straight lines in upper, lower, left and right parts.

A region for the detection of the cell-inscribed straight lines of the cell corresponding to the recognized cell is referred to as a cell-inscribed straight line detection region. FIGS. 22D and 22E are diagrams showing cell-inscribed straight line detection regions. For one recognized cell 2201, there are four cell-inscribed straight line detection regions 2206 to 2209 each of which is indicated by a dotted-line rectangle.

In the present embodiment, in the case where the color within the recognized cell is deleted, the pixel within the circumscribed rectangle corresponding to the recognized cell is not deleted, the cell-inscribed straight lines of the cell (the actual cell) corresponding to the recognized cell are detected and a region to be deleted is determined based on the detected cell-inscribed straight lines. Specific processing will be described below.

Figure 23:
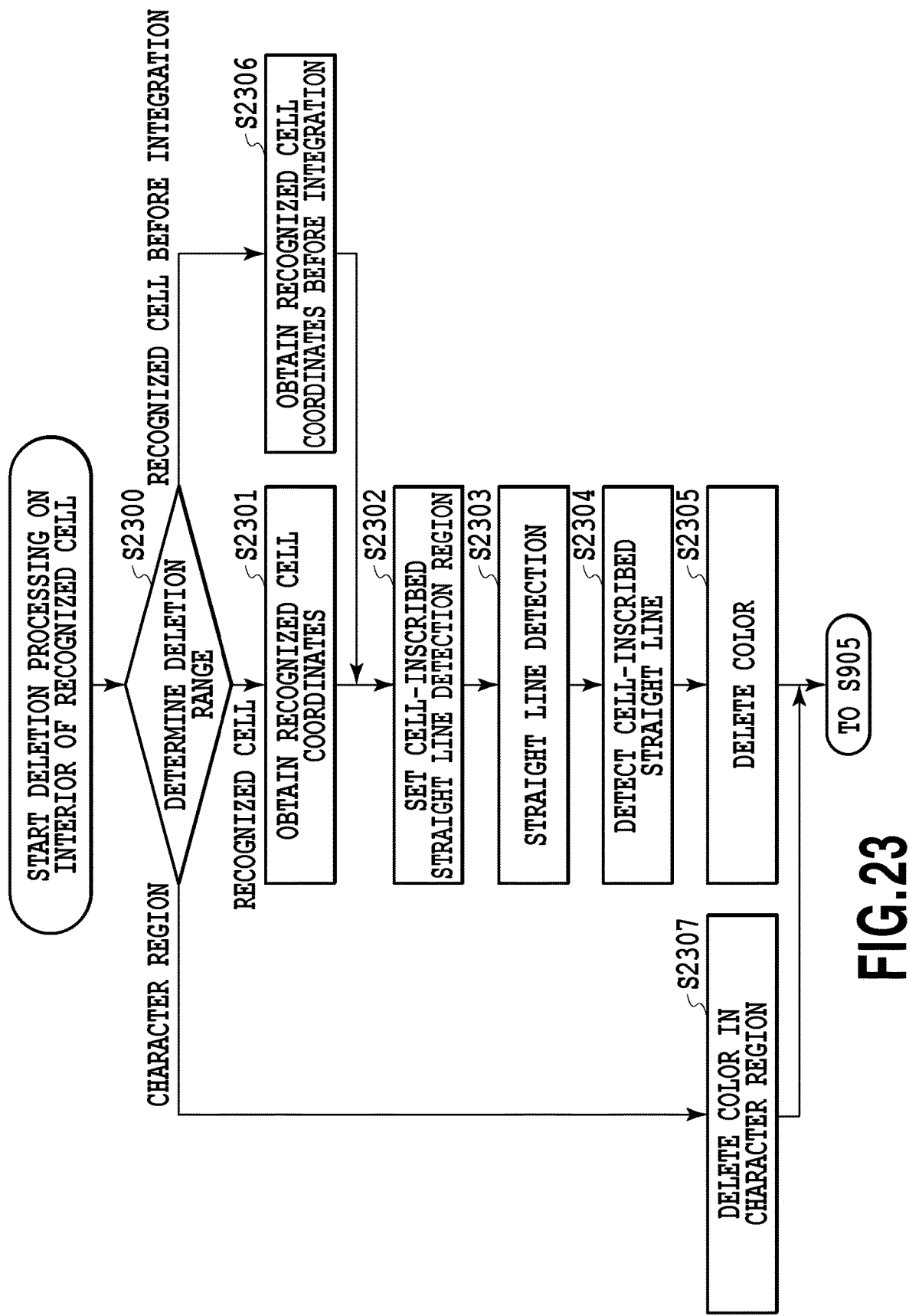
FIG. 23 is a diagram showing a flowchart for deletion of the interior of the recognized cell that will be described in the present embodiment.

FIG. 23 is a flowchart showing the detailed processing that deletes the interior of the recognized cell in step S904 of FIG. 9. In step S2300, the control unit 303 determines a deletion range. The deletion range is any one of the character region, the recognized cell before the coupling and the recognized cell, and the control unit 303 determines which range is to be deleted. Specifically, in the case where a plurality of character regions associated with the selected recognized cell is present, the control unit 303 determines that the deletion range is the character region and makes the processing proceed to step S2307. In step S2307, the control unit 303 obtains position information on the character region to be edited from the storage unit 302, and deletes color information within the character region. Specifically, the color information on the pixel within the region is replaced with white. As shown in FIGS. 20A and 20B, in the case where a plurality of character regions associated with the recognized cell is present, if all the interior of the recognized cell is deleted, the character region on which the edition processing is not performed may also be deleted. Hence, by the determination processing on the deletion range, it is possible to delete only the character region to be edited. In the case where only the character region is deleted, as compared with the deletion of the interior of the recognized cell, the possibility that the ruled lines of the cell disappear is low. Here, it can be considered that, in all the processing for deleting the interior of the recognized cell, only the character region is deleted, and thus the ruled lines are prevented from being removed. However, originally, the desire of the user to edit the cell is to cope with the problem in which for example, the cell or the character is erroneously recognized due to noise or the like. In the case where only the character region is deleted, it is likely that the desire of the user is not sufficiently satisfied. Hence, in the present embodiment, the interior of the recognized cell (before the coupling or after the coupling) is basically deleted, and as exceptional processing, the example where only the character region is deleted is indicated.

In step S2300, in the case where the selected recognized cell is the recognized cell after the coupling and the "interior of the recognized cell before the coupling is deleted" is selected in a radio button 1503 of FIG. 15, the control unit 303 determines that the deletion range is the recognized cell before the coupling. Then, in step S2306, the control unit 303 performs the processing that obtains the coordinates of the recognized cell before the coupling. In other words, the control unit 303 obtains, from the storage unit 302, position information on a plurality of recognized cells before the coupling which is associated with the selected recognized cell after the coupling and stored. In this case, it is assumed that the recognized cells in steps S2302 to S2306, which will be described later, are the recognized cells before the coupling. In other words, the control unit 303 performs processing in steps S2302 to S2305, which will be described later, on a plurality of recognized cells before the coupling to delete the interiors of the recognized cells before the coupling.

In step S2300, in the case where the deletion range is neither the character region nor the recognized cell before the coupling, the control unit 303 determines that the deletion range is the recognized cell. This includes a case where the recognized cell is the recognized cell after the coupling and in the radio button 1503 of FIG. 15, the "interior of the recognized cell after the coupling is deleted" is selected. In this case, it is assumed that the recognized cell in processing in steps S2301 to S2305 is the recognized cell after the coupling. In step S2301, the control unit 303 obtains, from the storage unit 302, position information on the selected recognized cell 2201.

Processing on the interior of the recognized cell will then be described. In step S2302, the control unit 303 sets the total of four cell-inscribed straight line detection regions 2206 to 2209 in upper, lower, left and right parts in the recognized cell 2201. The cell-inscribed straight line detection region 2206 in the upper part is a region that is obtained by extending the upper side of the recognized cell 2201 by a predetermined value (for example, 20 pixels . . . 0.50 cm) in vertical direction. The cell-inscribed straight line detection region 2207 in the lower part is set in the same method as that in the upper part. The cell-inscribed straight line detection region 2208 in the left part is a region that is obtained by extending the left side of the recognized cell by a predetermined value in lateral direction. The cell-inscribed straight line detection region 2209 in the right part is set in the same method as that in the left part.

In step S2303, the control unit 303 performs straight line detection on the cell-inscribed straight line detection regions 2206 to 2209 in the upper, lower, left and right parts. The straight line detection is performed using, for example, Hough transform.

Figure 24A:
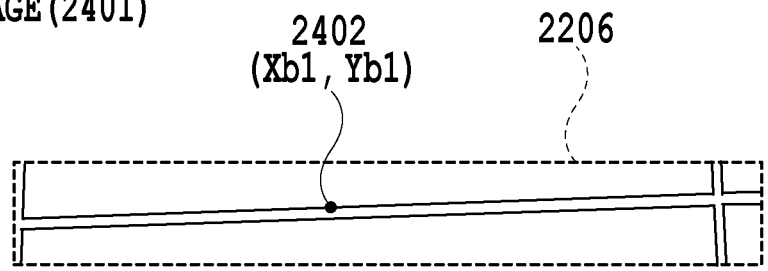
FIGS. 24A and 24B are diagrams showing detection of a cell-inscribed straight line that will be described in the present embodiment.
Figure 24B:
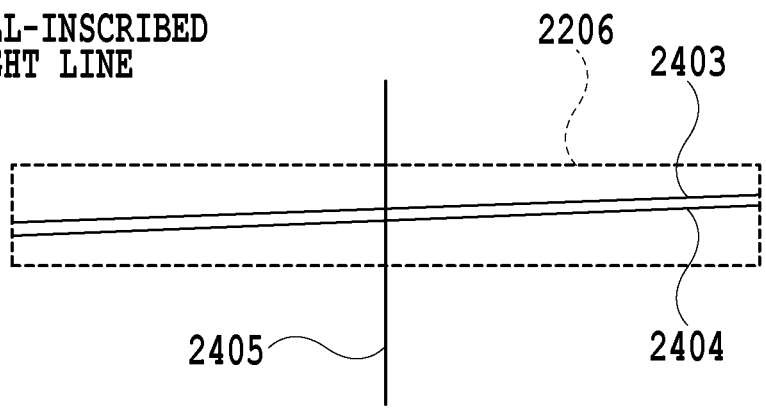

A method of performing the straight line detection on the cell-inscribed straight line detection region 2206 in the upper part with the Hough transform will be specifically described. The control unit 303 first performs edge detection on the cell-inscribed straight line detection region 2206 in the upper part. By the edge detection, the pixels are classified into edge pixels in which the difference in density with the pixels in the upper, lower, left and right parts is equal to or more than a threshold value and non-edge pixels other than the edge pixels. FIGS. 24A and 24B are diagrams showing an example of the detection of the straight line within the cell. FIG. 24A shows an edge image 2401. The edge image 2401 is an image that is obtained by performing the edge detection on the cell-inscribed straight line detection region 2206 in the upper part and displaying the edge pixel as the black pixel. A pixel 2402 is one of the edge pixels within the cell-inscribed straight line detection region 2206 in the upper part, and the coordinates thereof are represented as (Xb1, Yb1). A straight line passing through (Xb1, Yb1) is represented by Formula 1. Here, ρ represents a length in the case where a normal is drawn to the straight line from the origin, and θ represents an angle formed with the x-axis. A value that is obtained by rounding off the first decimal place of ρ to an integer is assumed to be ρi.

$$\rho = Xb1 \cos\theta + Yb1 \sin\theta \quad \text{Formula 1}$$

Figure 25:
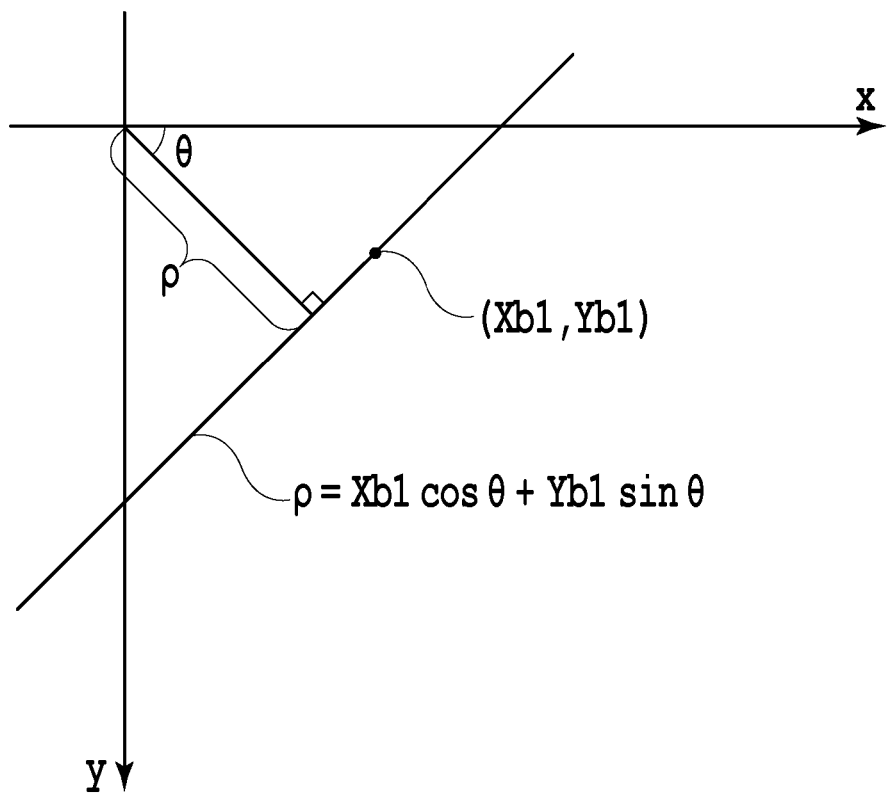
FIG. 25 is a diagram illustrating meaning of Formula 1 that will be described in the present embodiment.

The straight line represented by Formula 1 above is shown in FIG. 25. The control unit 303 determines 360 combinations of (ρ, θ) of the straight line passing through (Xb1, Yb1) by varying θ by a predetermined amount of variation (for example, by one degree) from 0 degrees to 360 degrees and calculating the value of ρ for each value of θ. The control unit 303 performs, within the cell-inscribed straight line detection region 2206 in the upper part, this processing on all the edge pixels to determine the number of the edge pixels×360 combinations of (ρ, θ). With the assumption that the number of edge pixels is 100, 36000 combinations of (ρ, θ) are obtained. Among them, the same combinations are naturally present, and the number of times the same combination appears is determined such that, for example, the combination of (ρ1, θ1) appears 20 times and the combination of (ρ2, θ2) appears 30 times. In other words, the frequency of occurrence of the combination of (ρi, θi) is determined. The frequency of occurrence described above is compared with a threshold value, and the combination of (ρi, θi) exceeding the threshold value is regarded as the formula that represents the straight line.

In the case of the cell-inscribed straight line detection region in the upper part or the lower part, the threshold value is assumed to be a value obtained by multiplying the width of the cell-inscribed straight line detection region by a predetermined constant (for example, 0.7). In the case of the cell-inscribed straight line detection region in the left part or the right part, the threshold value is assumed to be a value obtained by multiplying the height of the cell-inscribed straight line detection region by a predetermined constant. Consequently, in the example of FIGS. 24A and 24B, the straight line detection is performed on the edge image 2401, with the result that two straight lines 2403 and 2404 are detected. The straight lines 2403 and 2404 are lines in which the detected straight lines are indicated by the black pixels. The control unit 303 performs the straight line detection on each of the lower part, the left part and the right part in the same method.

In step S2304, the control unit 303 identifies the cell-inscribed straight lines based on the results of the straight line detection in step S2303. For example, in the case of the cell-inscribed straight line detection region in the upper part, two straight lines are detected from the cell-inscribed straight line detection region 2206 in the upper part. From these two straight lines, the straight line most inwardly with respect to the recognized cell, that is, the straight line in the lowermost part is detected as the cell-inscribed straight line in the upper part.

Mathematically, in FIG. 24B, the value of the y coordinate of each of the detected straight lines 2403 and 2404 in the x coordinate 2405 in the center of the cell-inscribed straight line detection region 2206 in the upper part is calculated, and the straight line in which the value of the y coordinate is the highest is identified as the cell-inscribed straight line. In the example of FIG. 24B, the straight line 2404 in which the value of the y coordinate is the highest is identified as the cell-inscribed straight line.

In the case where no straight line is detected in the cell-inscribed straight line detection region in the upper part, the control unit 303 identifies the side on the upper part of the recognized cell as the cell-inscribed straight line. In the case where only one straight line is detected, such a straight line is naturally identified as the cell-inscribed straight line. For each of the lower part, the left part and the right part, the control unit 303 likewise detects the most inward straight line as the cell-inscribed straight line.

In step S2305, the control unit 303 deletes the color information within the region surrounded by the four cell-inscribed straight lines in the upper, lower, left and right parts in the scan image. Specifically, the color information on the pixel within the region is replaced with white.

In the case where the color information within the region surrounded by the four cell-inscribed straight lines in the upper, lower, left and right parts is deleted, in order for the processing to be simplified, for example, the color information on a rectangle 2221 within the region surrounded by the four cell-inscribed straight lines indicated by dotted lines in FIG. 22F may be deleted. A specific method of identifying the rectangle 2221 is described below. It is assumed that an intersection 2215 in the upper left part of the cell-inscribed straight line is coordinates (Xc1, Yc1), an intersection 2216 in the lower left part is coordinates (Xc2, Yc2), an intersection 2217 in the lower right part is coordinates (Xc3, Yc3) and an intersection in the upper right part is coordinates (Xc4, Yc4). The lower value of A and B is represented by min (A, B), and the higher value of A and B is represented by max (A, B). In the rectangle 2221, the upper left coordinates 2219 are represented by (max (Xc1, Xc2), max (Yc1, Yc4)), and the lower right coordinates 2220 are represented by (min (Xc3, Xc4), min (Yc2, Yc3)). The color information within the rectangle is deleted, and thus it is possible to delete the color information on the rectangle 2221 within the region surrounded by the four cell-inscribed straight lines.

By the processing in steps S2300 to S2307, it is possible to delete the colors other than the ruled lines within the recognized cell without deleting the ruled lines of the cells in the scan image.

As described above, in the present embodiment, in the case where the table region is erroneously recognized, it becomes easy to edit the characters. It is also possible to prevent the ruled lines in the scan image from being deleted.

Second Embodiment

In the first embodiment, the method of reducing the recognized cell to divide the recognized cell is described. On the other hand, in the present embodiment, another method of dividing the recognized cell will be described.
<Description of FIGS. 26 and 27>

Figure 26:
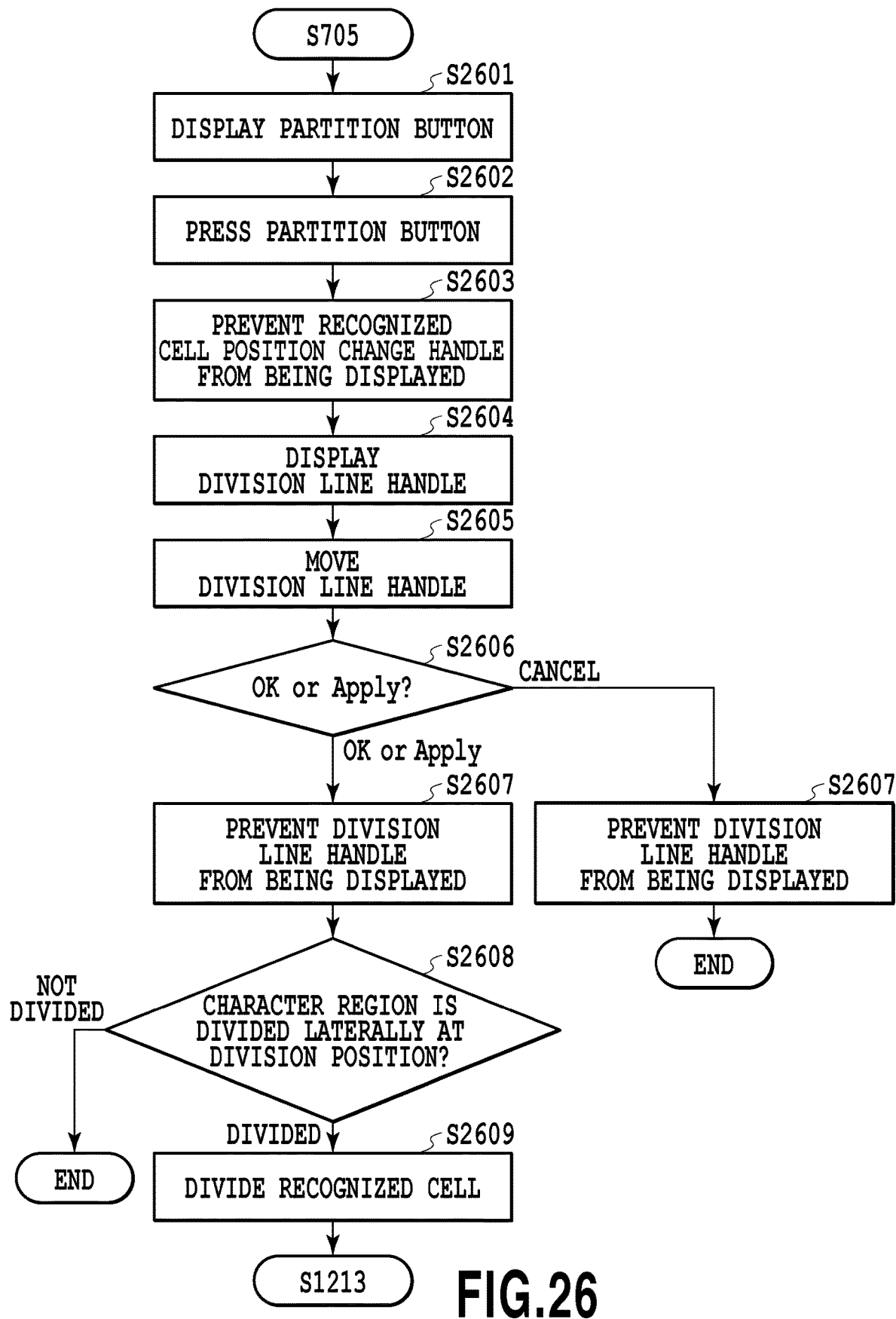
FIG. 26 is a flowchart in a second embodiment.

The present embodiment will be described with reference to FIGS. 26 and 27. FIG. 26 is the flowchart of the present embodiment, and FIG. 27 is a diagram for additionally illustrating FIG. 26.

After step S705, the control unit 303 displays a Partition button in an edition window 2704 (S2601). FIG. 27 shows an example of the display of the Partition button. In FIG. 27, the Partition button 2701 is displayed in the edition window 2704. The Partition button may be present in a place other than the edition window. Instead of the button, a display method such as a menu may be used.

Then, the user presses the Partition button (S2602).

Then, the control unit 303 prevents the recognized cell position change handle from being displayed (S2603).

Then, the control unit 303 displays a straight line indicating a position where the recognized cell is divided, and brings it into the selected state (S2604). In the following description, the straight line indicating the position where the recognized cell is divided is referred to as a division line handle. The initial display position of the division line handle is assumed to be present in the intermediate part of the x coordinate of the selected recognized cell, and is displayed so as to cross the recognized cell in the direction of the y-axis.

An example of the display of the division line handle is shown in FIG. 27. In FIG. 27, in a state where the Partition button 2701 is pressed by the user, the division line handle 2702 is displayed.

Then, the user drags the division line handle in the direction of the x-axis to the position where it is desired to divide the recognized cell (S2605).

Then, the control unit 303 determines which one of the OK button, the Apply button and the Cancel button is pressed by the user (S2606).

In the case where the Cancel button is determined to be pressed, the control unit 303 prevents the division line handle from being displayed (S2607). Then, the processing is completed.

In the case where the OK button or the Apply button is determined to be pressed, the control unit 303 determines whether or not the character region present within the recognized cell before being divided is separated laterally at the position of the division line handle (S2608).

In the case where the division is determined not to be performed in S2608, the control unit 303 does not divide the recognized cell and completes the processing. This is because in the case where the recognized cell is divided in the position of the division line handle, the recognized cell which does not include the character region is produced.

In the case where the division is determined to be performed in S2608, the control unit 303 divides the recognized cell. It is assumed that the upper left coordinates of the recognized cell before being divided are (x1, y1), the lower right coordinates thereof are (x2, y2) and the x coordinate of the division line handle is X. The control unit 303 produces the recognized cell where the upper left coordinates are (x1, y1) and the lower right coordinates are (X, y2) and the recognized cell where the upper left coordinates are (X, y1) and the lower right coordinates are (x2, y2). Then, the recognized cell before being divided is deleted from the storage unit 302.

Thereafter, the processing proceeds to the processing in S1213, and the recognized cell is finally divided.

Although in the flowchart of FIG. 26, the method of dividing the recognized cell in the direction of the X-axis is described, the recognized cell can be divided in the direction of the Y-axis in a similar way of thinking.

Third Embodiment

In the present embodiment, a method of automatically adjusting, in the case where the user determines the position where the recognized cell is divided, the position where the recognized cell is divided according to the details of the scan image will be described.

To which position the position where the recognized cell is divided is adjusted will first be described with reference to FIGS. 28 and 29.

<Description of FIG. 28>

FIG. 28 shows the part of the table region in the display screen displaying the frame of the recognized cell in FIG. 6 in a state where the recognized cell 403 is selected.

Since the ruled lines within the recognized cell 403 are faint, the recognized cell 403 which is originally formed with a plurality of cells is identified as a single recognized cell. Hence, the user reduces the recognized cell 403 and divides the recognized cell 403. Here, it can be considered that the position where the user divides the recognized cell 403 is any of the ruled lines 2801, 2802 and 2803 of the table. In other words, the user divides the recognized cell 403 along the ruled line of the table region.

Here, in the case of a tablet in particular, since the display unit 304 is small, it may be difficult to align the position where the recognized cell is divided to the positon of the ruled line.

Hence, in the case where the user determines the position where the recognized cell is divided, a function of automatically aligning the division position to the position of the ruled line of the table is provided, and thus the burden of the user is reduced.

Figure 29:
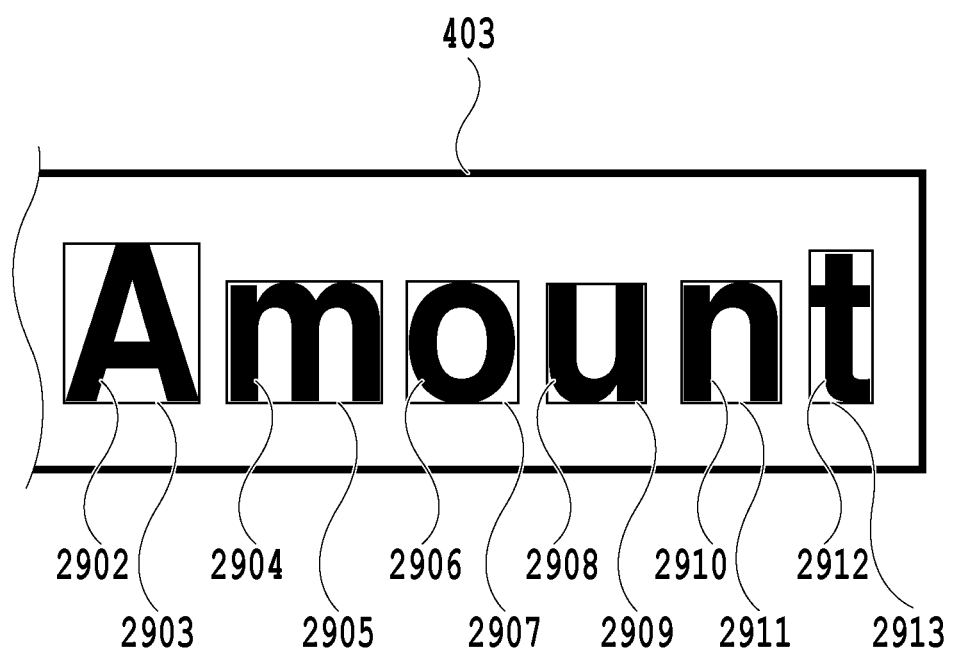
FIG. 29 is an example of a circumscribed rectangle used in description of the third embodiment.

<Description of FIG. 29>

FIG. 29 shows an enlarged part in the vicinity of the right side of the recognized cell 403. Symbol 2902 represents an original character of "A" within the scan image. Symbol 2903 represents a circumscribed rectangle of the original character of "A". The same is true for symbols 2904 to 2912.

The user can arbitrarily specify the position where the recognized cell is divided. However, even in the case where the division position is specified within the range of one character, since the division of one character is meaningless, one character needs not to be divided. For example, even in the case where the division position is specified within the region of a circumscribed rectangle 3003 of the original character "A", it is preferable not to divide one character of "A".

Hence, in the case where the user determines the division position, even if the division position is specified within the range of one character, the division position is automatically adjusted and thus one character is prevented from being divided.

Figure 30:
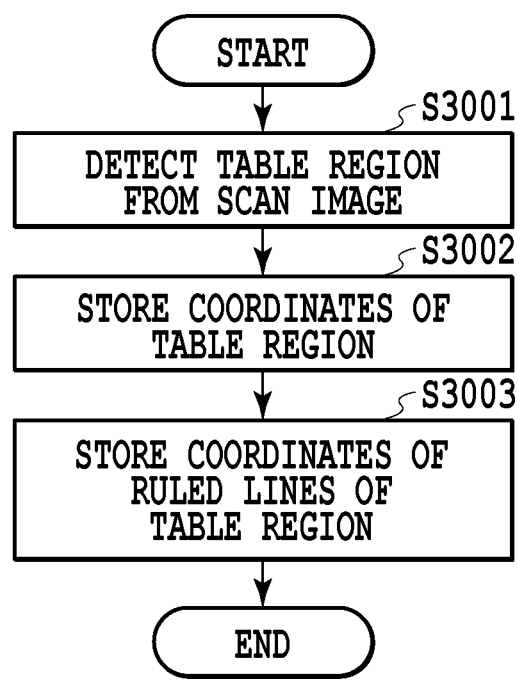
FIG. 30 is a flowchart 1 in the third embodiment.

<Description of FIG. 30>

Figure 31:
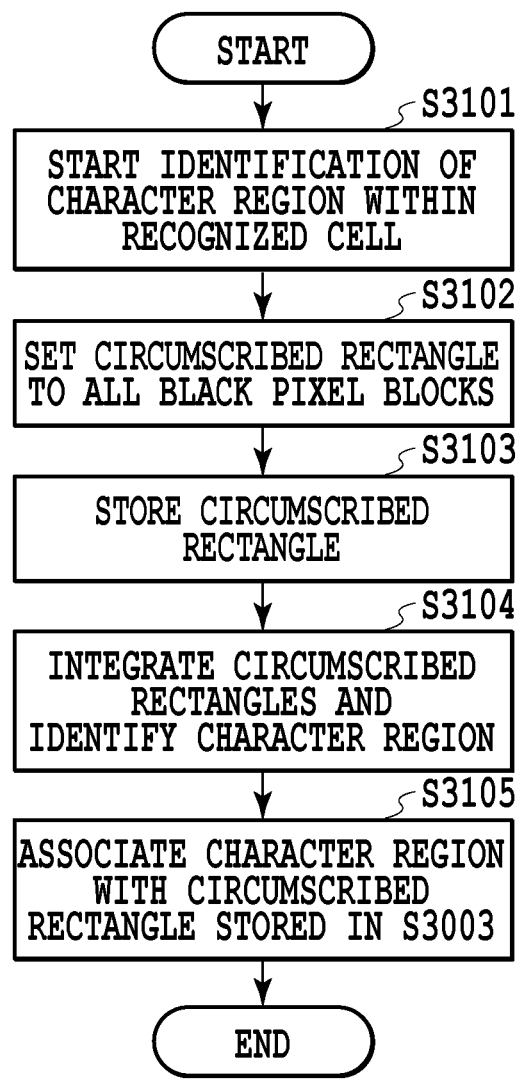
FIG. 31 is a flowchart 2 in the third embodiment.

A method of automatically adjusting the division position will be described with reference to FIGS. 30, 31 and 32. In the processing of FIGS. 30 and 31, information necessary for automatically adjusting the division position is stored in the storage unit 302. The information is used to automatically adjust the division position in the processing of FIG. 32.

FIG. 30 is a flowchart in which processing that stores the necessary information is added to the processing described in the "(3) Table region detection" in the <first embodiment>.

The control unit 303 first detects the table region from the scan image (S3001).

Then, the control unit 303 stores the upper left coordinates and the lower right coordinates of the table region in the storage unit 302 (S3002).

Then, the control unit 303 stores the coordinates of the ruled lines of the table region in the storage unit 302 (S3003). For example, in the example of the case of FIG. 28, the X coordinate of each of the ruled lines 2801, 2802 and 2803 in the longitudinal direction is stored in the storage unit 302.

<Description of FIG. 31>

FIG. 31 is a flowchart in which processing that stores the necessary information is added to the processing described in the "(5) Identification of a character region within the recognized cell" in the <first embodiment>.

The control unit 303 starts the identification of the character region within the recognized cell (S3101).

Then, the control unit 303 sets the circumscribed rectangle to all the black pixel blocks (S3102).

Then, the control unit 303 stores the circumscribed rectangle in the storage unit 302 (S3103). Specifically, the upper left coordinates and the lower right coordinates of each circumscribed rectangle are stored.

Then, the control unit 303 integrates the circumscribed rectangles, and finally identifies the character region (S3104).

Then, the control unit 303 associates the character region with the circumscribed rectangle stored in S3003, and stores information on the association in the storage unit 302 (S3005). For example, the circumscribed rectangles of "A", "m", "o", "u", "n" and "t" are associated with the character region of an original character of "Amount".

Figure 32:
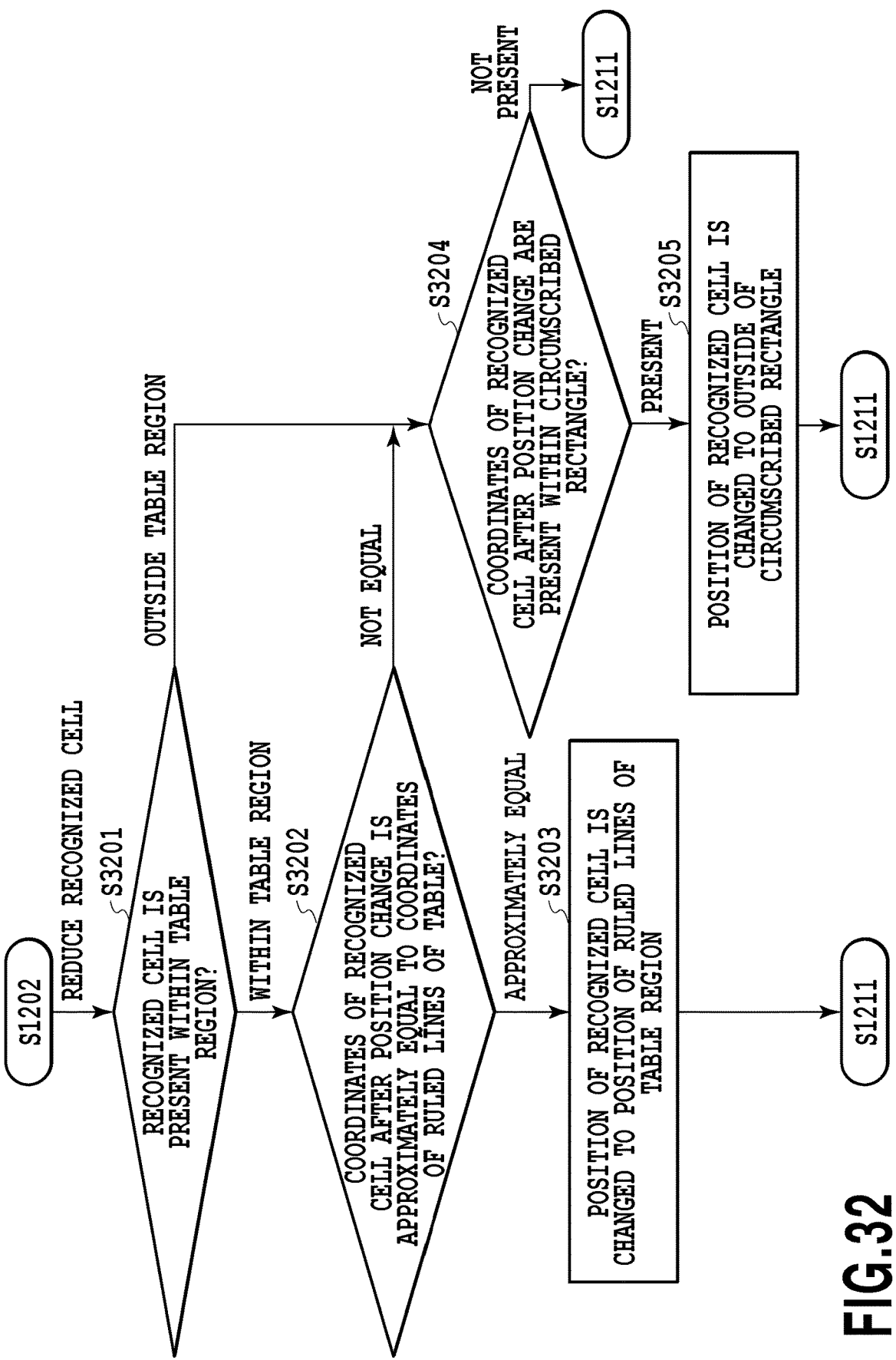
FIG. 32 is a flowchart 3 in the third embodiment.

<Description of FIG. 32>

In the case where the recognized cell is determined to be reduced in S1202, the control unit 303 determines whether or not the selected recognized cell is present within the table region (S3201). Specifically, the determination is made based on the coordinates of the recognized cell and the coordinates of the table region stored in S3002.

In the case where the recognized cell is determined to be present within the table region, the control unit 303 determines whether or not the coordinates of the recognized cell after the position change are approximately equal to the coordinates of the ruled lines of the table (S3202). Specifically, the determination is made based on the coordinates of the ruled lines of the table region stored in S3003 and the coordinates of the recognized cell after the position change. For example, assuming that the position of the recognized cell is changed in the leftward direction, with the result that the lower right coordinates of the recognized cell are (x, y). It is also assumed that there are three ruled lines in the table region and that the X coordinates of the ruled lines are x1, x2 and x3. Here, the control unit 303 determines whether or not to satisfy any of:

$$x1-w<x<x1+w$$

$$x2-w<x<x2+w$$

$$x3-w<x<x3+w$$

where w is an arbitrary value but preferably is, for example, a small value such as 0.1.

In the case where they are determined to be approximately equal to each other in S3202, the control unit 303 changes the position of the recognized cell after the position change to the position of the ruled lines of the table region (S3203). For example, in the case where in the example described above, "x2−w<x<x2+w" is satisfied, the control unit 303 changes the x coordinate of the recognized cell to x2. By the present processing, the problem described in FIG. 28 is solved.

Thereafter, the processing proceeds to the processing in S1211, and the recognized cell is finally divided.

On the other hand, in the case where the recognized cell is determined to be outside the table region in S3203 or in the case where they are determined not to be equal to each other in S3202, the processing that aligns the position of the recognized cell to the position of the ruled lines of the table region is not performed, and the processing proceeds to the processing in S3204.

The control unit 303 determines whether or not the coordinates of the recognized cell after the position change are present within the circumscribed rectangle of one character (S3204). Specifically, the control unit 303 first determines whether or not the coordinates of the recognized cell after the position change are present within the character region. In the example of FIG. 29, whether or not the coordinates of the recognized cell after the position change are included in the character region of the "Amount" is determined. In the case where they are included, the control unit 303 then determines, based on the information stored in s3103 and S3105, whether or not the coordinates of the recognized cell after the position change are included in each of the circumscribed rectangles within the character region. For example, it is assumed that the position of the recognized cell is changed in the leftward direction, and consequently, the lower right coordinates of the recognized cell are changed into (x, y). Here, whether or not x is present within the circumscribed rectangle is determined. In the example of FIG. 29, whether or not x is present within the circumscribed rectangles 2902, 2905, 2907, 2909, 2911 and 2913 is determined.

In the case where they are determined not to be present within the circumscribed rectangle in S3204, the position adjustment on the recognized cell is not performed, and the processing proceeds to S1211.

In the case where they are determined to be present within the circumscribed rectangle in S3204, the control unit 303 changes the position of the recognized cell after the position change to the outside of the circumscribed rectangle. It is assumed that the upper left coordinates of the recognized cell after the position change are (Xa, Ya) and that the lower right coordinates thereof are (Xb, Yb). It is also assumed that the upper left coordinates of the circumscribed rectangle are (X1, Y1), the lower right coordinates thereof are (X2, Y2) and X1<Xb<X2. In other words, it is assumed that the coordinates of the recognized cell after the position change are included in the circumscribed rectangle. Here, the control unit 303 determines whether or not Xb−X1>X2−Xb is satisfied. In the case where it is satisfied, the control unit 303 changes the value of Xb to X2. In the case where it is not satisfied, the control unit 303 changes the value of Xb to X1. In other words, the control unit 303 changes the position of the recognized cell to the closer side of the left and right of the circumscribed rectangle. By the present processing, the problem described in FIG. 29 is solved.

Thereafter, the processing proceeds to the processing in S1211, and the recognized cell is finally divided.

In this way, it is possible to automatically adjust the position of the recognized cell.

Although in the above discussion, the method of dividing the recognized cell in the direction of the X-axis is described, the recognized cell can be divided in the direction of the Y-axis in a similar way of thinking.

Fourth Embodiment

In the first embodiment, the method of enlarging the recognized cell to couple the recognized cell is described. On the other hand, in the present embodiment, a method of dragging the recognized cell to couple the recognized cell will be described.

Figure 33:
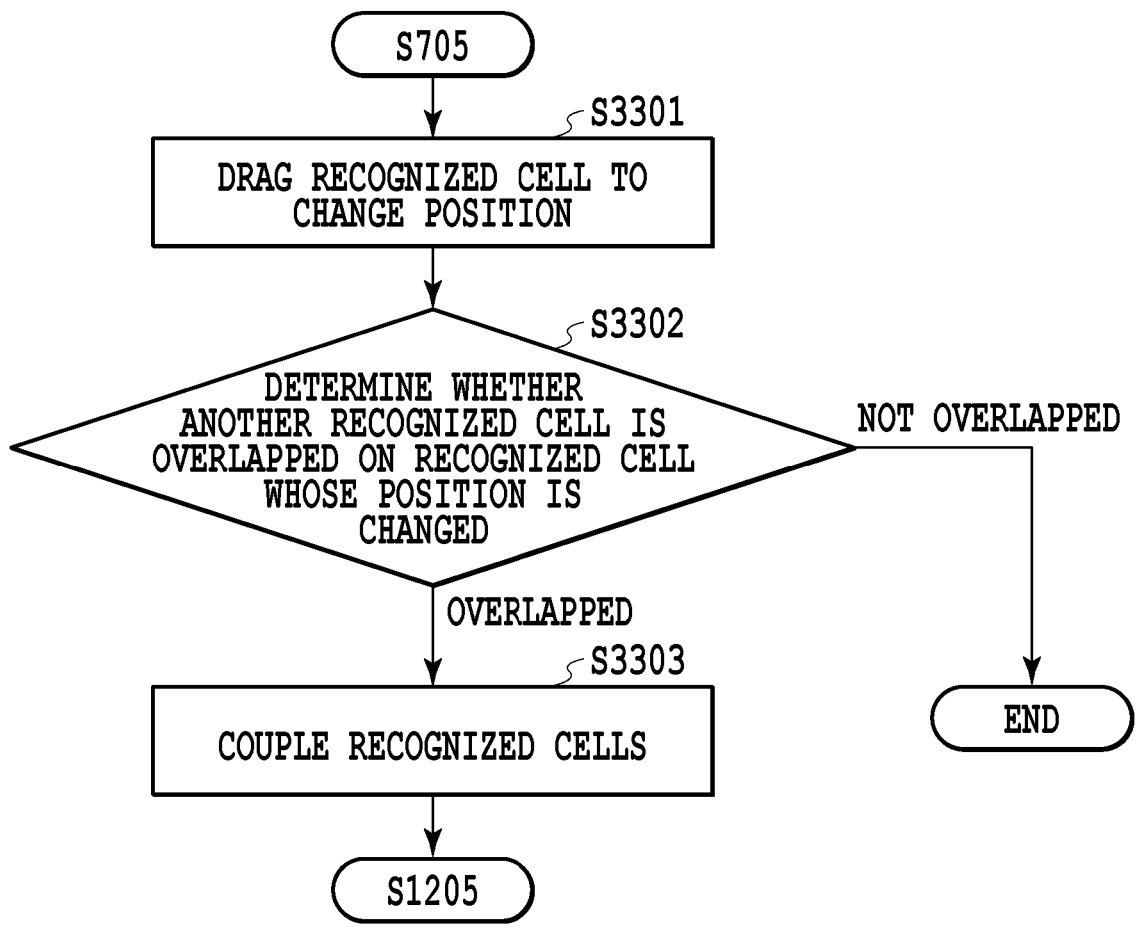
FIG. 33 is a flowchart in a fourth embodiment.

<Description of FIG. 33>

The user first drags the recognized cell to change the position of the recognized cell (S3301).

Then, the control unit 303 determines whether or not another recognized cell is overlapped on the recognized cell after the position change (S3302). Specifically, the control unit 303 first determines the area S of a region including both the recognized cell after the position change and the another recognized cell. Then, the control unit 303 determines whether or not the area S is larger than N % of the area of each recognized cell. Specifically, it is assumed that the area of the recognized cell after the position change is S1 and that the area of the another recognized cell is S2, and the control unit 303 determines whether or not any of S1×(N/100)<S and S2×(N/100)<S is satisfied. For example, in the case where N=80, it indicates that the area S is larger than 80% of the area of any of the recognized cells. In other words, in the case where the area including both the recognized cell after the position change and the another recognized cell is large to some extent, the two recognized cells are determined to be overlapped.

The processing that determines whether or not the recognized cells are overlapped is one example, and another determination method may be adopted.

In the case where the recognized cells are determined not to be overlapped in S3302, the processing is completed.

On the other hand, in the case where the recognized cells are determined to be overlapped in S3302, the control unit 303 couples the recognized cells that are determined to be overlapped (S3303). Specifically, in the coupling of the recognized cells, the control unit 303 first changes the position of one of the overlapped recognized cells. Thereafter, the position of the other recognized cell is deleted from the storage unit 302.

The coordinates of the recognized cell whose position has been changed are determined by the control unit 303 in the same method as in S1505 described above. In other words, the recognized cell after the coupling is the minimum rectangle that includes all the recognized cells before being coupled.

Thereafter, the processing proceeds to the processing in S1205, and the user can finally couple the recognized cells.
<Description of FIG. 34>

FIG. 34 is a diagram showing a display screen in which the position of the recognized cell 406 is changed from the display screen in the state where the recognized cell 406 of FIG. 13 is selected. The user drags, with a mouse 601, the recognized cell position change handle 3401 of the recognized cell 407 to overlap it on the recognized cell 407. According to the processing of FIG. 33, the control unit 303 couples the recognized cell 406 and the recognized cell 407. After the coupling of the recognized cells, the display screen shown in FIG. 15 is displayed.

Fifth Embodiment

Figure 35:
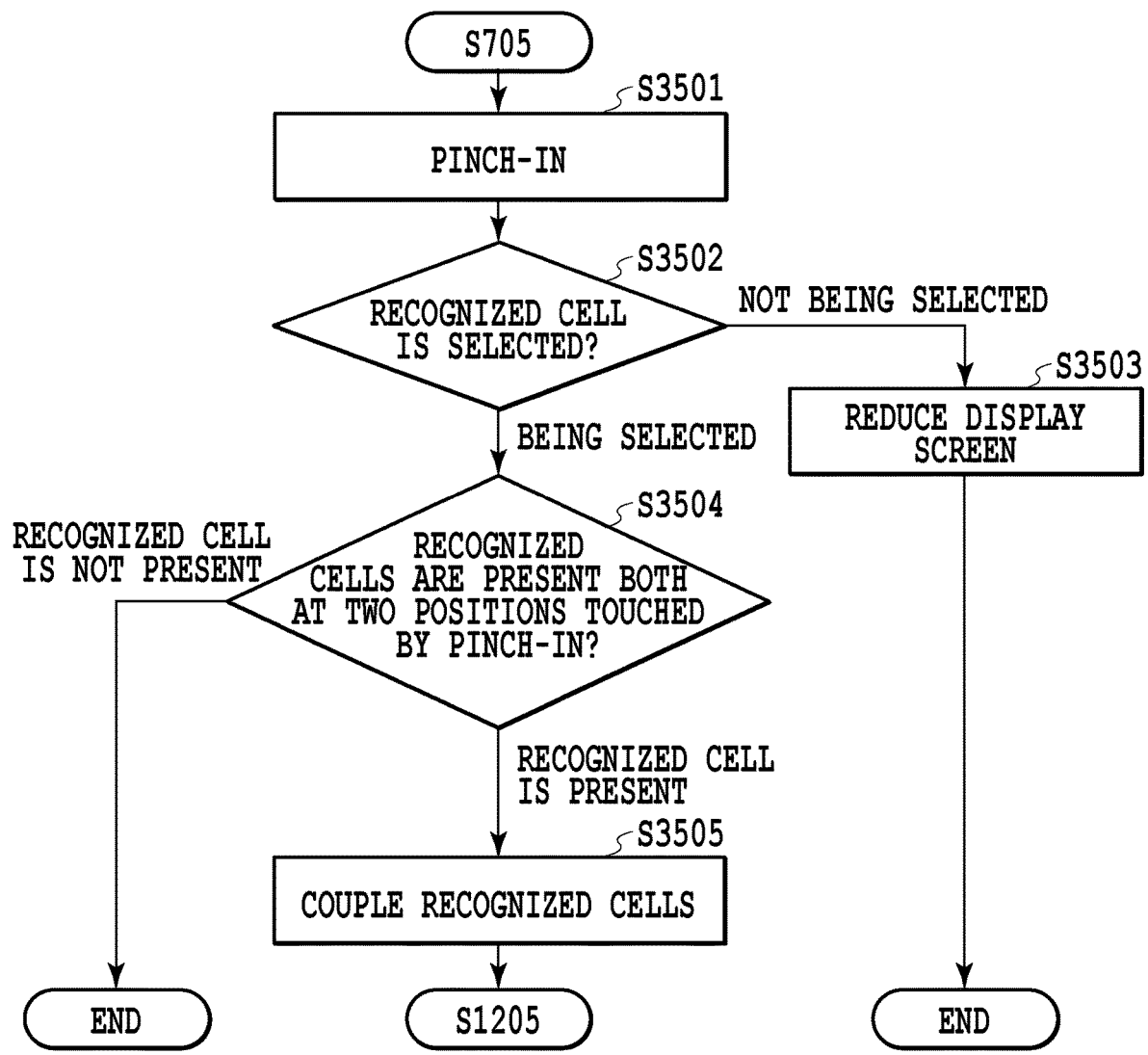
FIG. 35 is a flowchart in a fifth embodiment.

In the present embodiment, a method of coupling the recognized cells by a way other than those in the first and fourth embodiments will be described. In the present embodiment, it is assumed that the reception unit 305 and the display unit 304 are a touch panel.
<Description of FIG. 35>

The user first performs an operation of a pinch-in on the display unit 304 (S3501). The pinch-in refers to an operation of moving the display unit 304 so as to pinch arbitrary places of the display unit 304 with two fingers, and in general, it is an operation for reducing the display screen.

Then, the control unit 303 determines whether or not the recognized cell is selected (S3502). In the case where the recognized cell is not selected, the control unit 303 determines that it is an operation of reducing the display screen, and reduces the display screen (S3503).

On the other hand, in the case where the recognized cell is determined to be selected, the control unit 303 determines whether or not the recognized cells are present in each of the two positions touched by the user through the pinch-in (S3504). In the case where the recognized cell is determined not to be present at each of the two positions touched, the processing is completed.

In the case where the recognized cells are determined to be present in each of the two positions touched, the control unit 303 couples the two recognized cells (S3505). Specifically, the control unit 303 first changes the position of one of the recognized cells present at the two positions touched. Thereafter, the control unit 303 deletes the position of the other recognized cell from the storage unit 302.

The coordinates of the recognized cell whose position has been changed are determined by the control unit 303 in the same method as in S1205 described above. In other words, the recognized cell after the coupling is the minimum rectangle that includes all the recognized cells before being coupled.

Thereafter, the processing proceeds to the processing in S1205, and the user can finally couple the recognized cells.
<Description of FIG. 36>

FIG. 36 is a diagram showing how the user pinches in the display unit 304 from the display screen in a state where the recognized cell 406 of FIG. 13 is selected. In FIG. 36, the recognized cell 406 is selected. The user touches the recognized cell 406 and the recognized cell 407 with two fingers 3601 to perform the operation of the pinch-in. By this operation, the control unit 303 couples the recognized cell 406 and the recognized cell 407. After the coupling of the recognized cells, the display screen shown in FIG. 15 is displayed.

Sixth Embodiment

In the description of the first embodiment, in the case where the recognized cell is enlarged to include another recognized cell, the recognized cells are coupled. On the other hand, in the present embodiment, a description will be given of a unit configured to couple the recognized cells in the case where the recognized cells are overlapped to some extent without enlarging the recognized cell to include another recognized cell.
<Description of FIGS. 37 and 38>

Figure 37:
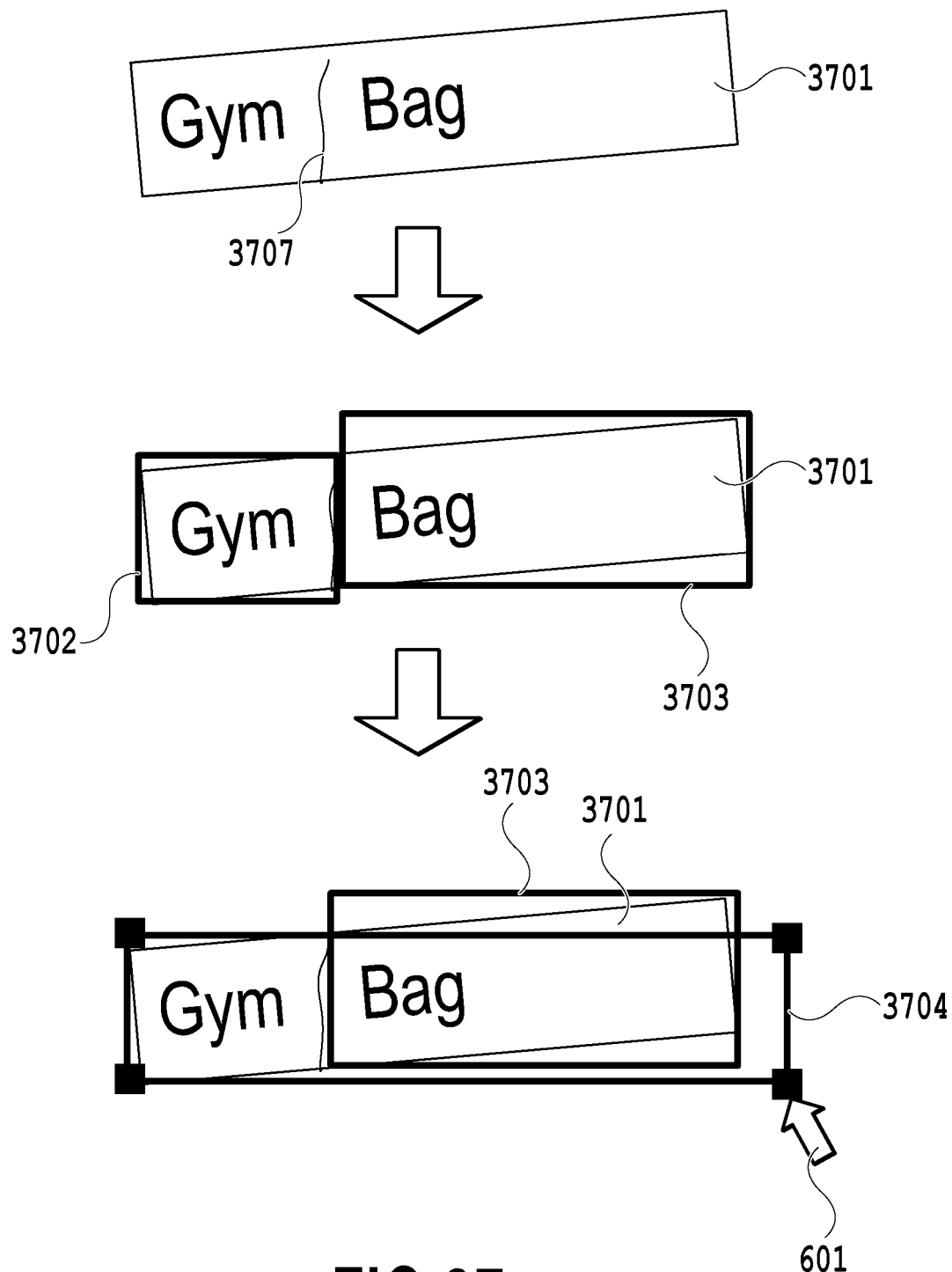
FIG. 37 is a diagram illustrating problems of a sixth embodiment.
Figure 38:
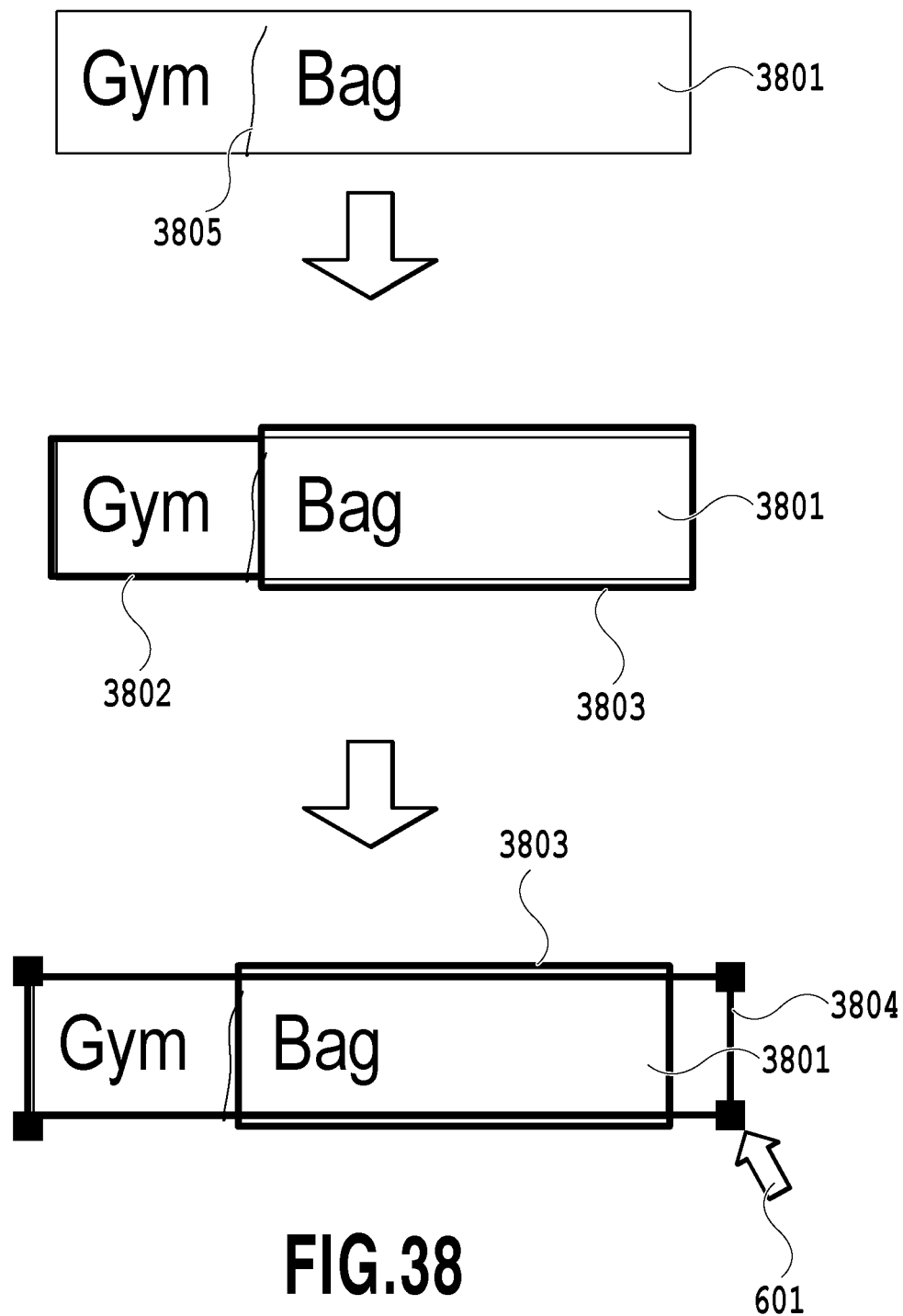
FIG. 38 is a diagram illustrating problems of a sixth embodiment.

FIGS. 37 and 38 are diagrams for illustrating a problem that is solved in the present embodiment.

Symbol 3701 in FIG. 37 represents one of the cells in the scan image. The cell 3701 is slightly inclined with the assumption that in the case where a document is scanned with the scanner 201, the scan image is inclined. Although in the figure, the cell 3701 is significantly inclined for ease of understanding, the inclination is actually a few dots, and it is assumed that a case where the inclination cannot be visually determined is included. In the cell 3701, a noise 3707 is present.

In the case where the control unit 303 performs analysis on the scan image, the cell is divided by the noise 3707, and a recognized cell 3702 and a recognized cell 3703 are identified. Here, since the cell 3701 is inclined, the heights of the recognized cell 3702 and the recognized cell 3703 are not aligned. Although in this figure, it is visually found that the heights are not aligned, the inclination is actually one dot at minimum, and it is assumed that a case where the inclination cannot be visually determined is included.

Then, the user is assumed to couple the recognized cell 3702 and the recognized cell 3703. As described in the first embodiment, the user tries to drag and enlarge the recognized cell position change handle 3704 of the recognized cell 3702 to include the recognized cell 3703. However, since the heights of the recognized cell 3702 and the recognized cell 3703 are not aligned, it is impossible to include the recognized cell 3703 only by enlarging the recognized cell 3702 in the rightward direction. Hence, in S1203 of FIG. 12, it is determined that another recognized cell is not included, and the control unit 303 does not couple the recognized cells. Although in the figure, it can be visually determined that the heights are not aligned, the inclination is actually one dot at minimum, and it is impossible to visually find the variation in the height. Since it is impossible to visually find the variation in the height, and thus the user erroneously think that the recognized cell is included, the user does not understand the reason why the recognized cells are not coupled. Although in the case of FIG. 37, the recognized cell 3702 is enlarged not in the rightward direction but in the upper right direction, and thus the recognized cell can be included, since it is impossible to visually find the variation in the height, the user may not find such an operation.

FIG. 38 will then be described. Symbol 3801 represents one of the cells in the scan image. The cell 3801 differs from the cell 3701 in that it is not inclined. In the cell 3801, a recognized cell 3802 and a recognized cell 3803 are identified by a noise 3805. Here, the heights of the recognized cell 3802 and the recognized cell 3803 are not aligned. The reason why the heights are not aligned is that there is an error in the case where the control unit 303 analyzes the scan image to identify the recognized cell. In the case where the control unit 303 detects the black pixel block to identify the ruled lines, an error is produced by the slightly faint scan image and the like, with the result that a variation in height between the recognized cell 3802 and the recognized cell 3803 is produced. Although in FIG. 38, the variation in height can be visually found, the inclination is actually one dot, and it is impossible to visually determine it.

In this case, as in the description of FIG. 37, it is impossible to include the recognized cell 3803 even by enlarging the recognized cell 3802, with the result that it is impossible to couple the recognized cells.

Figure 39:
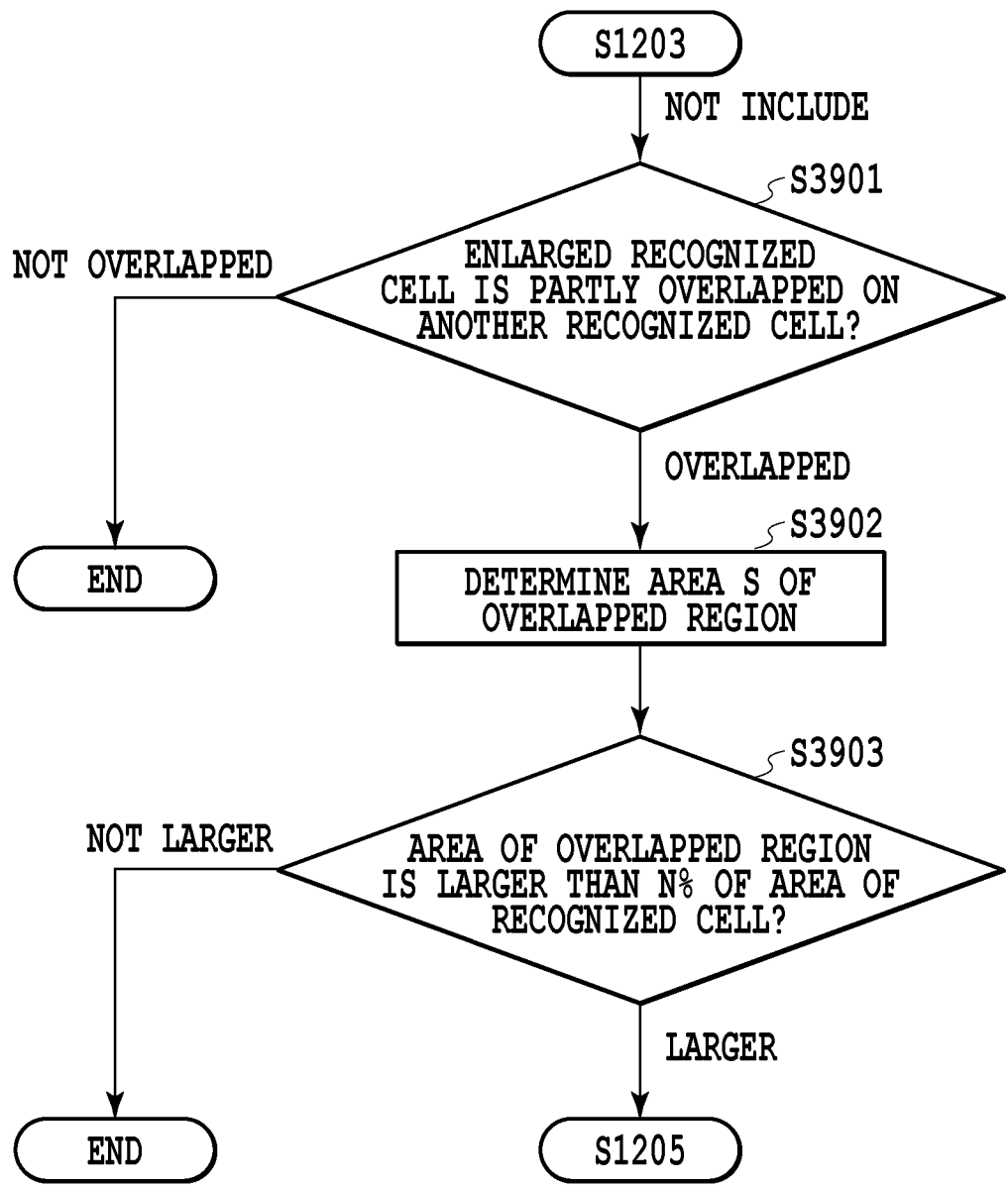
FIG. 39 is a flowchart in the sixth embodiment.

<Description of FIG. 39>

In FIG. 39, the problem that is described with reference to FIGS. 37 and 38 is solved.

First, in the case where in S1203, it is determined that the enlarged cell does not include another cell, the control unit 303 determines whether or not the enlarged recognized cell is partly overlapped on another cell (S3901). In the case where the enlarged recognized cell is determined not to be overlapped on another cell, the recognized cells are not coupled, and the processing is completed.

In the case where in S3901, the enlarged recognized cell is determined to be partly overlapped on another cell, the control unit 303 determines the area S of a region where the recognized cells are overlapped (S3902).

Then, the control unit 303 determines whether or not the area S is larger than N % of the area of each recognized cell (S3903). Specifically, it is assumed that the area of the recognized cell before being enlarged is S1 and that the area of the another recognized cell is S2, and the control unit 303 determines whether or not any of S1×(N/100)<S and S2×(N/100)<S is satisfied. For example, in the case where N=80, it indicates that the area S is larger than 80% of the area of any of the recognized cells.

In the case where the area S is determined not to be larger than N % of the area of each recognized cell, the recognized cells are not coupled, and the processing is completed.

On the other hand, in the case where the area S is determined to be larger than N % of the area of each recognized cell, the processing proceeds to S3903, and the recognized cells are coupled.

Other Embodiments

In the embodiments discussed above, the example where the scan image read by the scanner is edited has been described. This scan image may be an image read by various types of scanners, and may be an image obtained by image capturing with an image capturing device such as a camera scanner.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-169416, filed Aug. 22, 2014, No. 2014-139866, filed Jul. 7, 2014, and No. 2014-139867, filed Jul. 7, 2014 which are hereby incorporated by reference wherein in their entirety.

What is claimed is:

1. An information processing apparatus comprising:
a memory; and
at least one processor in communication with the memory, wherein the at least one processor performs:
executing an image analysis of a document image to identify cells within a table region included in the document image;
controlling to display the document image and frames corresponding to the identified cells, wherein the frames are displayed on the displayed document image;
selecting, based on a user instruction, one frame from the displayed frames;
controlling to further display handles for changing position of the selected one frame when the one frame is selected based on the user instruction;
changing the position of the selected one frame based on a user operation of the displayed handles;
determining whether the selected one frame is reduced beyond at least one character of characters included in the selected one frame by the change of the position of the selected one frame based on the user operation of the displayed handles; and
automatically generating, when it is determined that the selected one frame is reduced beyond at least one character of characters included in the selected one frame, a new frame which includes at least one character in the selected one frame and which does not include at least one character in an area except the reduced frame, wherein the new frame is not generated automatically when it is determined that the selected one frame is not reduced beyond at least one character of characters included in the selected one frame.

2. The information processing apparatus according to claim 1,
wherein a first character included in the reduced frame is associated with the new frame.

3. The information processing apparatus according to claim 2,
wherein the at least one processor further performs generating another new frame including at least one character in the area except the reduced frame.

4. The information processing apparatus according to claim 1,
wherein each of the cells that are identified by the image analysis of the document image is a circumscribed rectangle of a white pixel block within the table region.

5. The information processing apparatus according to claim 1,
wherein the document image is obtained by scanning a document.

6. The information processing apparatus according to claim 1,
wherein the at least one processor further performs coupling, if the selected one frame is enlarged by the change of the position of the selected one frame based on a user operation of the displayed handles and the enlarged frame includes another frame, the enlarged frame and the another frame included in the enlarged frame.

7. The information processing apparatus according to claim 1,
wherein the position of the reduced frame is automatically aligned to a position of a ruled line of the table region if a position changed based on the user operation of the displayed handles is approximately equal to the position of the ruled line of the table region.

8. A non-transitory computer-readable medium storing an application program for controlling a computer to:

execute an image analysis of a document image to identify cells within a table region included in the document image;

display the document image and frames corresponding to the identified cells, wherein the frames are displayed on the displayed document image;

select, based on a user instruction, one frame from the displayed frames;

display handles for changing position of the selected one frame when the one frame is selected based on the user instruction;

change the position of the selected one frame based on a user operation of the displayed handles;

determine whether the selected one frame is reduced beyond at least one character of characters included in the selected one frame by the change of the position of the selected one frame based on the user operation of the displayed handles; and automatically generate, when it is determined that the selected one frame is reduced beyond at least one character of characters included in the selected one frame a new frame which includes at least one character in the selected one frame and which does not include at least one character in an area except the reduced frame, wherein the new frame is not generated automatically when it is determined that the selected one frame is not reduced beyond at least one character of characters included in the selected one frame.

* * * * *